US010134421B1

(12) United States Patent
Sundaram

(10) Patent No.: US 10,134,421 B1
(45) Date of Patent: *Nov. 20, 2018

(54) NEURAL NETWORK BASED BEAM SELECTION

(71) Applicant: Amazon Technologies, Inc., Seattle, WA (US)

(72) Inventor: Shiva Kumar Sundaram, Mountain View, CA (US)

(73) Assignee: Amazon Technologies, Inc., Seattle, WA (US)

(*) Notice: Subject to any disclaimer, the term of this patent is extended or adjusted under 35 U.S.C. 154(b) by 0 days.

This patent is subject to a terminal disclaimer.

(21) Appl. No.: 15/967,185

(22) Filed: Apr. 30, 2018

Related U.S. Application Data

(63) Continuation of application No. 15/228,617, filed on Aug. 4, 2016, now Pat. No. 9,972,339.

(51) Int. Cl.
| G10L 15/00 | (2013.01) |
| G10L 25/30 | (2013.01) |
| G10L 17/08 | (2013.01) |
| G10L 21/028 | (2013.01) |
| G10L 17/04 | (2013.01) |
| G10L 21/0216 | (2013.01) |

(52) U.S. Cl.
CPC .............. G10L 25/30 (2013.01); G10L 17/04 (2013.01); G10L 17/08 (2013.01); G10L 21/028 (2013.01); G10L 2021/02166 (2013.01)

(58) Field of Classification Search
CPC ... A61M 2205/3553; A61M 2205/3584; G06F 19/3468; G11B 2020/1062; G11B 2020/10833
USPC .......................................................... 704/232
See application file for complete search history.

(56) References Cited

U.S. PATENT DOCUMENTS

| 9,008,686 B2 * | 4/2015 | Hannuksela .......... G01S 3/8034 455/404.2 |
| 2017/0140268 A1 * | 5/2017 | van Hasselt ............. G06N 3/08 |
| 2017/0178664 A1 * | 6/2017 | Wingate ................ G10L 21/028 |

* cited by examiner

Primary Examiner — Charlotte M Baker
(74) Attorney, Agent, or Firm — Pierce Atwood LLP

(57) ABSTRACT

A neural network model, such as a deep neural network (DNN), is trained using many speech examples to perform beam selection in a microphone array-based speech processing system. The DNN is trained using many different speech examples that are labeled with position or direction information relative to a training microphone array. The DNN may then be trained to recognize a direction of incoming speech so that at runtime the trained DNN may process input audio data from a microphone array and may output to a beam selector an indicator of the desired beam that may be selected for further processing. The DNN may be configured to output a beam index and/or coordinates (or other position data) corresponding to an estimated location of the detected speech. The DNN may also be configured to output acoustic unit data corresponding to speech units (for example corresponding to phonemes, senons, etc. such as those of a detected wakeword or other word).

20 Claims, 23 Drawing Sheets

For Training Audio Frame f at Training

For Training Audio Frame f at Training

NEURAL NETWORK BASED BEAM SELECTION

CROSS REFERENCE TO RELATED APPLICATION

This application is a continuation of, and claims the benefit of priority of, U.S. Non-provisional patent application Ser. No. 15/228,617, filed Aug. 4, 2016 and entitled "NEURAL NETWORK BASED BEAM SELECTION," in the name of Shiva Kumar Sundaram, which is herein incorporated by reference in its entirety.

BACKGROUND

Speech recognition systems have progressed to the point where humans can interact with computing devices using speech. Such systems employ techniques to identify the words spoken by a human user based on the various qualities of a received audio input. Speech recognition combined with natural language understanding processing techniques enable speech-based user control of a computing device to perform tasks based on the user's spoken commands. The combination of speech recognition and natural language understanding processing techniques is commonly referred to as speech processing. Speech processing may also convert a user's speech into text data which may then be provided to various text-based software applications.

Speech processing may be used by computers, hand-held devices, telephone computer systems, kiosks, and a wide variety of other devices to improve human-computer interactions.

BRIEF DESCRIPTION OF DRAWINGS

For a more complete understanding of the present disclosure, reference is now made to the following description taken in conjunction with the accompanying drawings.

DETAILED DESCRIPTION

Automatic speech recognition (ASR) is a field of computer science, artificial intelligence, and linguistics concerned with transforming audio data associated with speech into text representative of that speech. Similarly, natural language understanding (NLU) is a field of computer science, artificial intelligence, and linguistics concerned with enabling computers to derive meaning from text input containing natural language. ASR and NLU are often used together as part of a speech processing system.

ASR and NLU can be computationally expensive. That is, significant computing resources may be needed to process ASR and NLU within a reasonable time frame. Because of this, a distributed computing environment may be used when performing speech processing. A typical distributed environment may involve a local device having one or more microphones configured to capture sounds from a user speaking and convert those sounds into an audio signal. The audio signal/data may then be sent to a downstream remote device for further processing, such as converting the audio signal into an ultimate command. The command may then be executed by a combination of remote and local devices depending on the command itself.

In certain situations, an environment in which a speech command is spoken may be crowded, loud, or otherwise noisy in a manner that may interfere with speech processing.

For example, a user may speak an utterance including a command for a system to execute, but the device capturing the user's utterance may be in an environment with other individuals who are also talking. A system may have difficulty in such situations identifying audio corresponding to the user who spoke the command (i.e., the desired speaker) so that speech recognition may be performed on that desired audio rather than on speech from other persons who are not speaking commands to the system or other noise that may be present in the environment.

Offered is a system and method that improves the ability of the system to identify a direction from which desired speech is received, thus improving the ability of the system to isolate audio corresponding to the desired speech and perform speech processing using the isolated audio. In particular, a neural network classifier may be trained to perform voice activity detection and determine a direction that desired speech is received from. Based on the output of the neural network classifier, the system may then select audio corresponding to that direction for further processing. The neural network classifier may also be trained to perform some speech processing itself, such as identifying speech units corresponding to input audio data.

Figure 1:
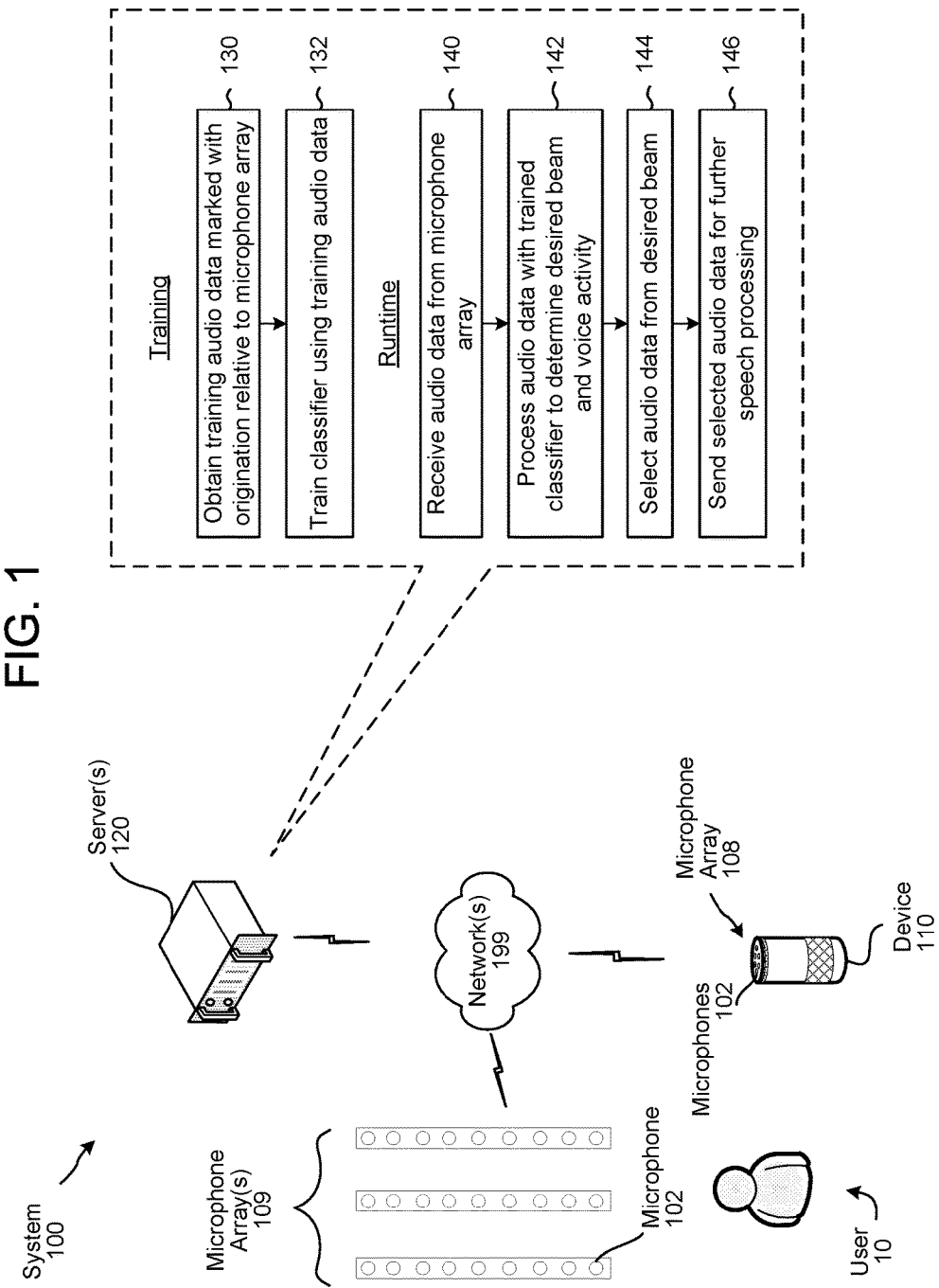
FIG. 1 shows a system configured to perform speech recognition using a recurrent neural network representation of a lattice according to embodiments of the present disclosure.

FIG. 1 shows a system 100 configured to perform speech recognition using a trained neural network classifier beam selector according to embodiments of the disclosure. Although FIG. 1, and other figures/discussion illustrate the operation of the system in a particular order, the steps described may be performed in a different order (as well as certain steps removed or added) without departing from the intent of the disclosure. As shown in FIG. 1, a system 100 may include one or more devices 110 including a microphone array 108 or separate microphone array(s) 109 proximate to a desired user(s) 10 and capable of capturing audio from the user 10. The system 100 may also include one or more networks 199 and one or more servers 120 connected to device 110 across network(s) 199. The server(s) 120 (which may be one or more different physical devices) may be capable of performing traditional speech processing (such as ASR, NLU, query parsing, etc.) as described herein. A single server may be capable of performing all speech processing or multiple server(s) 120 may combine to perform the speech processing. Further, the server(s) 120 may be configured to execute certain commands, such as answering queries spoken by user 10. In addition, certain speech detection or command execution functions may be performed by device 110. Certain servers 120 may be configured to train a neural network classifier while others may be configured to perform speech processing using audio data selected by the neural network classifier.

As shown in FIG. 1, during a training period the system 100 may obtain (130) training audio data where the training audio data is marked with the audio's origination position relative to the device or microphone array that captured the audio data. The training data may then be used to train (132) a classifier that can, at runtime, receive input audio data and classify the input audio data with an estimated origination position or location relative to the capturing device. The training data may be selected from audio captured using a similar audio capture environment as may be used at runtime to capture input audio data. For example, if runtime audio data will be captured using a device 110, the training data may also be captured using similar devices 110 with similar audio capture components (such as microphone array 108) so that the classifier will be properly trained to classifier incoming audio at runtime. At runtime the system, for example using device 110, may receive (140) audio data from a microphone array 108. That received audio data may include separate streams of audio data, for example, from different beams of a beamformer, discussed below. The system may process (142) the audio data with a trained classifier to determine a desired beam from among the available beams, where the desired beam includes the audio that comprises speech. The system may also process the audio data with the trained classifier to determine if the audio data includes voice activity. The system may select (144) the audio data from the desired beam and may send (146) the selected audio data for further processing.

Figure 2:
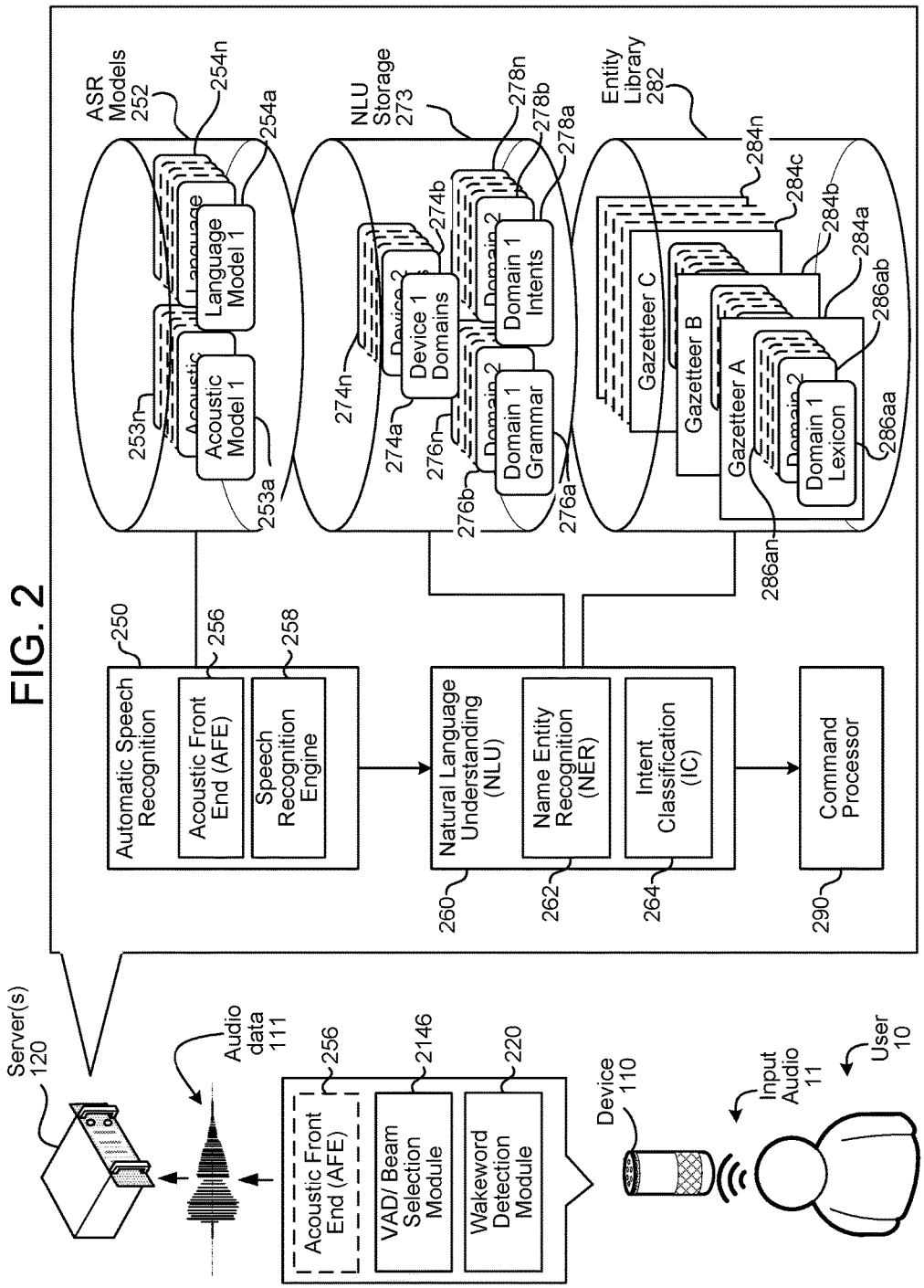
FIG. 2 is a conceptual diagram of a speech processing system according to embodiments of the present disclosure.

Further details of training and using a classifier to perform voice activity detection and beam selection using the present improvements are discussed below, following a discussion of the overall speech processing system of FIG. 2. FIG. 2 is a conceptual diagram of how a spoken utterance is traditionally processed, allowing a system to capture and execute commands spoken by a user, such as spoken commands that may follow a wakeword. The various components illustrated may be located on a same or different physical devices. Communication between various components illustrated in FIG. 2 may occur directly or across a network 199. An audio capture component, such as a microphone array 108 of device 110, captures audio 11 corresponding to a spoken utterance. The device 110, using a wakeword detection module 220, then processes the audio, or audio data corresponding to the audio, to determine if a keyword (such as a wakeword) is detected in the audio. Following detection of a wakeword, the device sends audio data 111 corresponding to the utterance, to a server 120 that includes an ASR module 250. The audio data 111 may be output from an acoustic front end (AFE) 256 located on the device 110 prior to transmission. Or the audio data 111 may be in a different form for processing by a remote AFE 256, such as the AFE 256 located with the ASR module 250.

The wakeword detection module 220 works in conjunction with other components of the device, for example a microphone array 108 to detect keywords in audio 11. For example, the device 110 may convert audio 11 into audio data, and process the audio data with the wakeword detection module 220 to determine whether speech is detected, and if so, if the audio data comprising speech matches an audio signature and/or model corresponding to a particular keyword.

The device 110 may use various techniques to determine whether audio data includes speech. Some embodiments may apply voice activity detection (VAD) techniques executed by a VAD/beam selection module 2146. Such techniques may determine whether speech is present in an audio input based on various quantitative aspects of the audio input, such as the spectral slope between one or more frames of the audio input; the energy levels of the audio input in one or more spectral bands; the signal-to-noise ratios of the audio input in one or more spectral bands; or other quantitative aspects. In other embodiments, the device 110 may implement a trained classifier (further discussed below) configured to distinguish speech from background noise. The classifier may be implemented by techniques such as linear classifiers, support vector machines, and decision trees. In still other embodiments, Hidden Markov Model (HMM) or Gaussian Mixture Model (GMM) techniques may be applied to compare the audio input to one or more acoustic models in speech storage, which acoustic models may include models corresponding to speech, noise (such as environmental noise or background noise), or silence. Still other techniques may be used to determine whether speech is present in the audio input.

Once speech is detected in the audio received by the device 110 (or separately from speech detection), the device 110 may use the wakeword detection module 220 to perform wakeword detection to determine when a user intends to speak a command to the device 110. This process may also be referred to as keyword detection, with the wakeword being a specific example of a keyword. Specifically, keyword detection is typically performed without performing linguistic analysis, textual analysis or semantic analysis. Instead, incoming audio (or audio data) is analyzed to determine if specific characteristics of the audio match preconfigured acoustic waveforms, audio signatures, or other data to determine if the incoming audio "matches" stored audio data corresponding to a keyword.

Thus, the wakeword detection module 220 may compare audio data to stored models or data to detect a wakeword. One approach for wakeword detection applies general large vocabulary continuous speech recognition (LVCSR) systems to decode the audio signals, with wakeword searching conducted in the resulting lattices or confusion networks. LVCSR decoding may require relatively high computational resources. Another approach for wakeword spotting builds hidden Markov models (HMM) for each key wakeword word and non-wakeword speech signals respectively. The non-wakeword speech includes other spoken words, background noise etc. There can be one or more HMMs built to model the non-wakeword speech characteristics, which are named filler models. Viterbi decoding is used to search the best path in the decoding graph, and the decoding output is further processed to make the decision on keyword presence. This approach can be extended to include discriminative information by incorporating hybrid DNN-HMM decoding framework. In another embodiment the wakeword spotting system may be built on deep neural network (DNN)/recurrent neural network (RNN) structures directly, without HMM involved. Such a system may estimate the posteriors of wakewords with context information, either by stacking frames within a context window for DNN, or using RNN. Following-on posterior threshold tuning or smoothing is applied for decision making. Other techniques for wakeword detection, such as those known in the art, may also be used.

Once the wakeword is detected, the local device 110 may "wake" and begin transmitting audio data 111 corresponding to input audio 11 to the server(s) 120 for speech processing. Audio data corresponding to that audio may be sent to a server 120 for routing to a recipient device or may be sent to the server for speech processing for interpretation of the included speech (either for purposes of enabling voice-communications and/or for purposes of executing a command in the speech). The audio data 111 may include data corresponding to the wakeword, or the portion of the audio data corresponding to the wakeword may be removed by the local device 110 prior to sending.

Upon receipt by the server(s) 120, the system 100 may use various techniques for determining the beginning and end of speech to be processed. For purposes of illustration, in system 100 the beginpoint of speech is described as determined by the device 110 and the endpoint of the speech is described as determined by the server 120 (after receipt of corresponding audio data from the device 110), but different components may perform the beginpointing/endpointing without diverging from the present disclosure.

To determine the beginning or end of an audio command, a number of techniques may be used. In one embodiment the system may determine pauses in spoken words and may interpret those pauses as potential breaks in a conversation. Thus, while the discussion herein may refer to determining or declaring an endpoint, what the system does is estimate that a spoken command has ended (i.e., reached an endpoint) based on the various considerations described herein. Breaks in a conversation may be considered as breaks between utterances and thus considered the beginning (beginpoint) or end (endpoint) of an utterance. The beginning/end of an utterance may also be detected using speech/voice characteristics. Other techniques may also be used to determine the beginning of an utterance (also called beginpointing) or end of an utterance (endpointing). Beginpointing/endpointing may be based, for example, on the number of silence/non-speech audio frames, for instance the number of consecutive silence/non-speech frames. For example, some systems may employ energy based or acoustic model based VAD techniques. Such techniques may determine whether speech is present in an audio input based on various quantitative aspects of the audio input, such as the spectral slope between one or more frames of the audio input; the energy levels (such as a volume, intensity, amplitude, etc.) of the audio input in one or more spectral bands; zero-crossing rate; the signal-to-noise ratios of the audio input in one or more spectral bands; or other quantitative aspects. These factors may be compared to one or more thresholds to determine if a break in speech has occurred that qualifies as a beginpoint/endpoint. Such thresholds may be set according to user input, or may be set by a device. In some embodiments, the beginpointing/endpointing may be further configured to determine that the audio input has an energy level satisfying a threshold for at least a threshold duration of time. In such embodiments, high-energy audio inputs of relatively short duration, which may correspond to sudden noises that are relatively unlikely to include speech, may be ignored. The beginpointing/endpointing may compare the energy level to the energy level threshold (and optionally to the threshold duration) to determine whether the energy level threshold is met.

In certain embodiments, HMM or GMM techniques may be applied to compare the audio input to one or more acoustic models in speech storage, which acoustic models may include models corresponding to speech, noise (such as environmental noise or background noise), or silence/non-speech. Non-speech frames may not necessarily represent complete silence (for example, certain noise may still be present in the audio), but the frames may lack acoustic characteristics typical of speech and thus may be deemed to be non-speech frames. Still other techniques may be used to determine whether speech begins/ends in the input audio data. Once a wakeword/beginpoint is detected, the device 110 may begin sending audio data to the server 120. The server 120 will continue speech processing on the audio data until an endpoint is detected. The audio data from the beginpoint to the endpoint is thus considered by the system 100 when performing the speech processing for the utterance.

Once audio data corresponding to speech is identified, an ASR module 250 may convert the audio data 111 into text. The ASR transcribes audio data into text data representing the words of the speech contained in the audio data. The text data may then be used by other components for various purposes, such as executing system commands, inputting data, etc. A spoken utterance in the audio data is input to a processor configured to perform ASR which then interprets the utterance based on the similarity between the utterance and pre-established language models 254 stored in an ASR model storage 252c. For example, the ASR process may compare the input audio data with models for sounds (e.g., subword units or phonemes) and sequences of sounds to identify words that match the sequence of sounds spoken in the utterance of the audio data.

The different ways a spoken utterance may be interpreted (i.e., the different hypotheses) may each be assigned a probability or a confidence score representing the likelihood that a particular set of words matches those spoken in the utterance. The confidence score may be based on a number of factors including, for example, the similarity of the sound in the utterance to models for language sounds (e.g., an acoustic model 253 stored in an ASR Models Storage 252), and the likelihood that a particular word which matches the sounds would be included in the sentence at the specific location (e.g., using a language or grammar model). Thus each potential textual interpretation of the spoken utterance (hypothesis) is associated with a confidence score. Based on the considered factors and the assigned confidence score, the ASR process 250 outputs the most likely text recognized in the audio data. The ASR process may also output multiple hypotheses in the form of a lattice or an N-best list with each hypothesis corresponding to a confidence score or other score (such as probability scores, etc.).

The device or devices performing the ASR processing may include an acoustic front end (AFE) 256 and a speech recognition engine 258. The acoustic front end (AFE) 256 transforms the audio data from the microphone into data for processing by the speech recognition engine. The speech recognition engine 258 compares the speech recognition data with acoustic models 253, language models 254, and other data models and information for recognizing the speech conveyed in the audio data. The AFE may reduce noise in the audio data and divide the digitized audio data into frames representing a time intervals for which the AFE determines a number of values, called features, representing the qualities of the audio data, along with a set of those values, called an audio feature vector, representing the features/qualities of the audio data within the frame. In one configuration each audio frame includes 25 ms of audio and the frames start at 10 ms intervals resulting in a sliding window where adjacent audio frames include 15 ms of overlapping audio. Many different features for a particular frame may be determined, as known in the art, and each feature represents some quality of the audio that may be useful for ASR processing. A number of approaches may be used by the AFE to process the audio data, such as mel-frequency cepstral coefficients (MFCCs), perceptual linear predictive (PLP) techniques, neural network feature vector techniques, linear discriminant analysis, semi-tied covariance matrices, or other approaches known to those of skill in the art. Thus the AFE may create an audio feature vector including a variety of data representing a particular audio frame.

The speech recognition engine 258 may process the output from the AFE 256 with reference to information stored in speech/model storage (252). Alternatively, post front-end processed data (such as audio feature vectors) may be received by the device executing ASR processing from another source besides the internal AFE. For example, the device 110 may process audio data into audio feature vectors (for example using an on-device AFE 256) and transmit that information to a server across a network 199 for ASR processing. Audio feature vectors may arrive at the server encoded, in which case they may be decoded prior to processing by the processor executing the speech recognition engine 258.

The speech recognition engine 258 attempts to match received audio feature vectors to language phonemes and words as known in the stored acoustic models 253 and language models 254. The speech recognition engine 258 computes recognition scores for the audio feature vectors based on acoustic information and language information. The acoustic information is used to calculate an acoustic score representing a likelihood that the intended sound represented by a group of audio feature vectors matches a language phoneme. The language information is used to adjust the acoustic score by considering what sounds and/or words are used in context with each other, thereby improving the likelihood that the ASR process will output speech results that make sense grammatically. The specific models used may be general models or may be models corresponding to a particular domain, such as music, banking, etc.

The speech recognition engine 258 may use a number of techniques to match audio feature vectors to phonemes, for example using Hidden Markov Models (HMMs) to determine probabilities that audio feature vectors may match phonemes. Sounds received may be represented as paths between states of the HMM and multiple paths may represent multiple possible text matches for the same sound. Instead of (or in addition to) phonemes, senons may be used as an acoustic unit. A senon is an acoustic realization of a phoneme. Each phoneme may have a number of different sounds depending on its context (e.g., the surrounding phonemes). While English may have approximately 50 phonemes it has several thousand senons. Use of senons in ASR processing may allow for improved ASR results.

Following ASR processing, the ASR results may be sent by the speech recognition engine 258 to other processing components, which may be local to the device performing ASR and/or distributed across the network(s) 199. For example, ASR results in the form of a single textual representation of the speech, an N-best list including multiple hypotheses and respective scores, lattice, etc. may be sent to a server, such as server 120, for natural language understanding (NLU) processing, such as conversion of the text into commands for execution, either by the device 110, by the server 120, or by another device (such as a server running a specific application like a search engine, etc.).

The device performing NLU processing 260 (e.g., server 120) may include various components, including potentially dedicated processor(s), memory, storage, etc. A device configured for NLU processing may include a named entity recognition (NER) module 252 and intent classification (IC) module 264, a result ranking and distribution module 266, and NLU storage 273. The NLU process may also utilize gazetteer information (284a-284n) stored in entity library storage 282. The gazetteer information may be used for entity resolution, for example matching ASR results with different entities (such as song titles, contact names, etc.) Gazetteers may be linked to users (for example a particular gazetteer may be associated with a specific user's music collection), may be linked to certain domains (such as shopping), or may be organized in a variety of other ways.

The NLU process takes textual input (such as processed from ASR 250 based on the utterance 11) and attempts to make a semantic interpretation of the text. That is, the NLU process determines the meaning behind the text based on the individual words and then implements that meaning. NLU processing 260 interprets a text string to derive an intent or a desired action from the user as well as the pertinent pieces of information in the text that allow a device (e.g., device 110) to complete that action. For example, if a spoken utterance is processed using ASR 250 and outputs the text "call mom" the NLU process may determine that the user intended to activate a telephone in his/her device and to initiate a call with a contact matching the entity "mom."

The NLU may process several textual inputs related to the same utterance. For example, if the ASR 250 outputs N text segments (as part of an N-best list), the NLU may process all N outputs to obtain NLU results.

The NLU process may be configured to parsed and tagged to annotate text as part of NLU processing. For example, for the text "call mom," "call" may be tagged as a command (to execute a phone call) and "mom" may be tagged as a specific entity and target of the command (and the telephone number for the entity corresponding to "mom" stored in a contact list may be included in the annotated result).

To correctly perform NLU processing of speech input, the NLU process 260 may be configured to determine a "domain" of the utterance so as to determine and narrow down which services offered by the endpoint device (e.g., server 120 or device 110) may be relevant. For example, an endpoint device may offer services relating to interactions with a telephone service, a contact list service, a calendar/scheduling service, a music player service, etc. Words in a single text query may implicate more than one service, and some services may be functionally linked (e.g., both a telephone service and a calendar service may utilize data from the contact list).

The name entity recognition module 262 receives a query in the form of ASR results and attempts to identify relevant grammars and lexical information that may be used to construe meaning. To do so, a name entity recognition module 262 may begin by identifying potential domains that may relate to the received query. The NLU storage 273 includes a databases of devices (274a-274n) identifying domains associated with specific devices. For example, the device 110 may be associated with domains for music, telephony, calendaring, contact lists, and device-specific communications, but not video. In addition, the entity library may include database entries about specific services on a specific device, either indexed by Device ID, User ID, or Household ID, or some other indicator.

A domain may represent a discrete set of activities having a common theme, such as "shopping", "music", "calendaring", etc. As such, each domain may be associated with a particular language model and/or grammar database (276a-276n), a particular set of intents/actions (278a-278n), and a particular personalized lexicon (286). Each gazetteer (284a-284n) may include domain-indexed lexical information associated with a particular user and/or device. For example, the Gazetteer A (284a) includes domain-index lexical information 286aa to 286an. A user's music-domain lexical information might include album titles, artist names, and song names, for example, whereas a user's contact-list lexical information might include the names of contacts. Since every user's music collection and contact list is presumably different, this personalized information improves entity resolution.

A query is processed applying the rules, models, and information applicable to each identified domain. For example, if a query potentially implicates both communications and music, the query will be NLU processed using the grammar models and lexical information for communications, and will be processed using the grammar models and lexical information for music. The responses based on the query produced by each set of models is scored (discussed further below), with the overall highest ranked result from all applied domains is ordinarily selected to be the correct result.

An intent classification (IC) module 264 parses the query to determine an intent or intents for each identified domain, where the intent corresponds to the action to be performed that is responsive to the query. Each domain is associated with a database (278a-278n) of words linked to intents. For example, a music intent database may link words and phrases such as "quiet," "volume off," and "mute" to a "mute" intent. The IC module 264 identifies potential intents for each identified domain by comparing words in the query to the words and phrases in the intents database 278.

In order to generate a particular interpreted response, the NER 262 applies the grammar models and lexical information associated with the respective domain. Each grammar model 276 includes the names of entities (i.e., nouns) commonly found in speech about the particular domain (i.e., generic terms), whereas the lexical information 286 from the gazetteer 284 is personalized to the user(s) and/or the device. For instance, a grammar model associated with the shopping domain may include a database of words commonly used when people discuss shopping.

The intents identified by the IC module 264 are linked to domain-specific grammar frameworks (included in 276) with "slots" or "fields" to be filled. For example, if "play music" is an identified intent, a grammar (276) framework or frameworks may correspond to sentence structures such as "Play {Artist Name}," "Play {Album Name}," "Play {Song name}," "Play {Song name} by {Artist Name}," etc. However, to make recognition more flexible, these frameworks would ordinarily not be structured as sentences, but rather based on associating slots with grammatical tags.

For example, the NER module 260 may parse the query to identify words as subject, object, verb, preposition, etc., based on grammar rules and models, prior to recognizing named entities. The identified verb may be used by the IC module 264 to identify intent, which is then used by the NER module 262 to identify frameworks. A framework for an intent of "play" may specify a list of slots/fields applicable to play the identified "object" and any object modifier (e.g., a prepositional phrase), such as {Artist Name}, {Album Name}, {Song name}, etc. The NER module 260 then searches the corresponding fields in the domain-specific and personalized lexicon(s), attempting to match words and phrases in the query tagged as a grammatical object or object modifier with those identified in the database(s).

This process includes semantic tagging, which is the labeling of a word or combination of words according to their type/semantic meaning. Parsing may be performed using heuristic grammar rules, or an NER model may be constructed using techniques such as hidden Markov models, maximum entropy models, log linear models, conditional random fields (CRF), and the like.

For instance, a query of "play mother's little helper by the rolling stones" might be parsed and tagged as {Verb}: "Play," {Object}: "mother's little helper," {Object Preposition}: "by," and {Object Modifier}: "the rolling stones." At this point in the process, "Play" is identified as a verb based on a word database associated with the music domain, which the IC module 264 will determine corresponds to the "play music" intent. No determination has been made as to the meaning of "mother's little helper" and "the rolling stones," but based on grammar rules and models, it is determined that these phrase relate to the grammatical object of the query.

The frameworks linked to the intent are then used to determine what database fields should be searched to determine the meaning of these phrases, such as searching a user's gazette for similarity with the framework slots. So a framework for "play music intent" might indicate to attempt to resolve the identified object based {Artist Name}, {Album Name}, and {Song name}, and another framework for the same intent might indicate to attempt to resolve the object modifier based on {Artist Name}, and resolve the object based on {Album Name} and {Song Name} linked to the identified {Artist Name}. If the search of the gazetteer does not resolve the a slot/field using gazetteer information, the NER module 262 may search the database of generic words associated with the domain (in the NLU's storage 273). So for instance, if the query was "play songs by the rolling stones," after failing to determine an album name or song name called "songs" by "the rolling stones," the NER 262 may search the domain vocabulary for the word "songs." In the alternative, generic words may be checked before the gazetteer information, or both may be tried, potentially producing two different results.

The comparison process used by the NER module 262 may classify (i.e., score) how closely a database entry compares to a tagged query word or phrase, how closely the grammatical structure of the query corresponds to the applied grammatical framework, and based on whether the database indicates a relationship between an entry and information identified to fill other slots of the framework.

The NER modules 262 may also use contextual operational rules to fill slots. For example, if a user had previously requested to pause a particular song and thereafter requested that the voice-controlled device to "please un-pause my music," the NER module 262 may apply an inference-based rule to fill a slot associated with the name of the song that the user currently wishes to play—namely the song that was playing at the time that the user requested to pause the music.

The results of NLU processing may be tagged to attribute meaning to the query. So, for instance, "play mother's little helper by the rolling stones" might produce a result of: {domain} Music, {intent} Play Music, {artist name} "rolling stones," {media type} SONG, and {song title} "mother's little helper." As another example, "play songs by the rolling stones" might produce: {domain} Music, {intent} Play Music, {artist name} "rolling stones," and {media type} SONG.

The output from the NLU processing (which may include tagged text, commands, etc.) may then be sent to a command processor 290, which may be located on a same or separate server 120 as part of system 100. The destination command processor 290 may be determined based on the NLU output. For example, if the NLU output includes a command to play music, the destination command processor 290 may be a music playing application, such as one located on device 110 or in a music playing appliance, configured to execute a music playing command. If the NLU output includes a search request, the destination command processor 290 may include a search engine processor, such as one located on a search server, configured to execute a search command.

Figure 3:
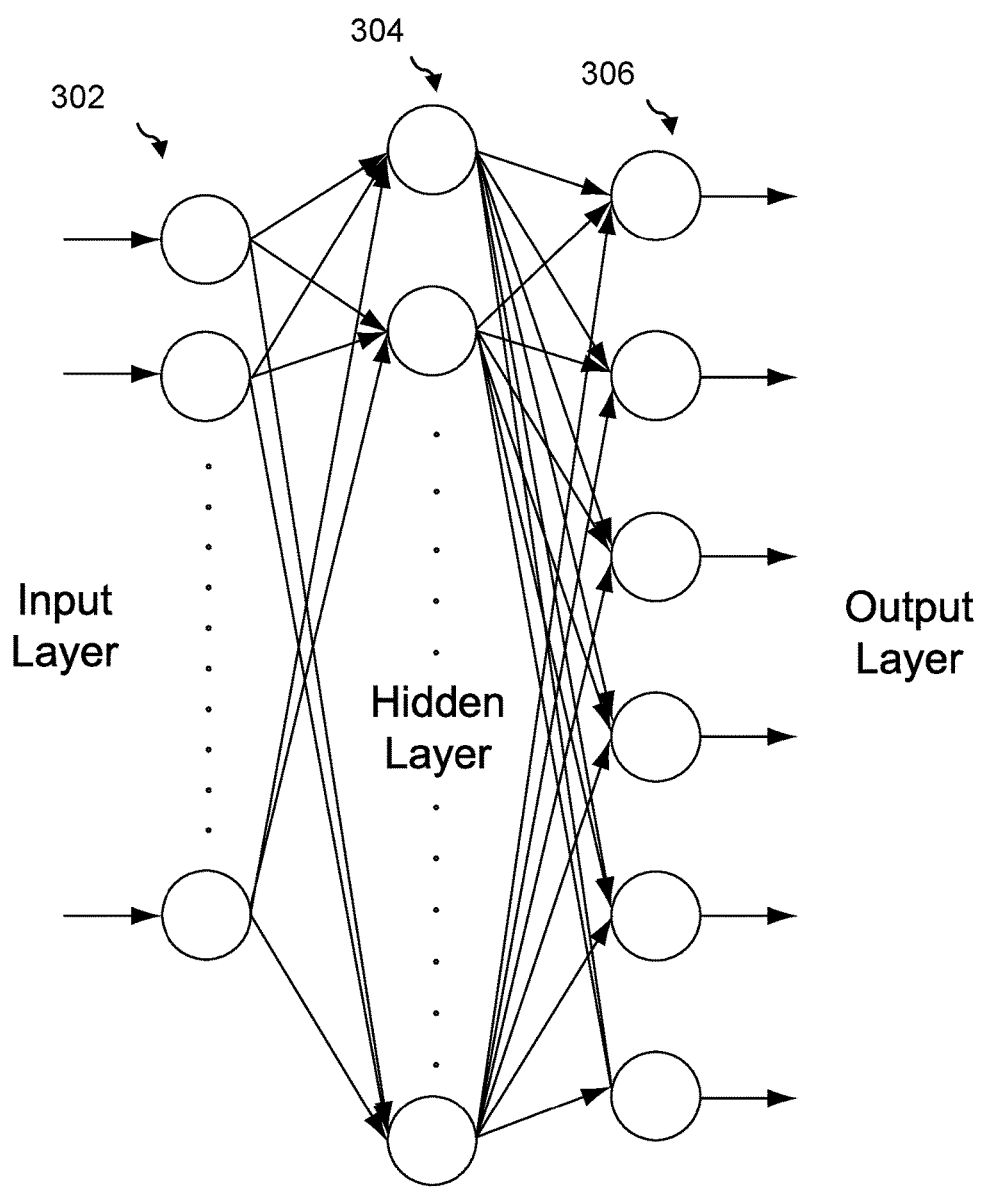
FIG. 3 illustrates a neural network for speech recognition according to embodiments of the present disclosure.

Neural networks may be used to perform ASR processing including acoustic model processing and language model processing. An example neural network for ASR is illustrated in FIG. 3. A neural network may be structured with an input layer 302, a middle layer 304, and an output layer 306. The middle layer may also be known as the hidden layer. Each node of the hidden layer is connected to each node in the input layer and each node in the output layer. Although illustrated in FIG. 3 with a single hidden layer, a neural network may include multiple middle layers. In this case each node in a hidden layer will connect to each node in the next higher layer and next lower layer. Each node of the input layer represents a potential input to the neural network and each node of the output layer represents a potential output of the neural network. Each connection from one node to another node in the next layer may be associated with a weight or score. A neural network may output a single output or a weighted set of possible outputs.

Figure 4:
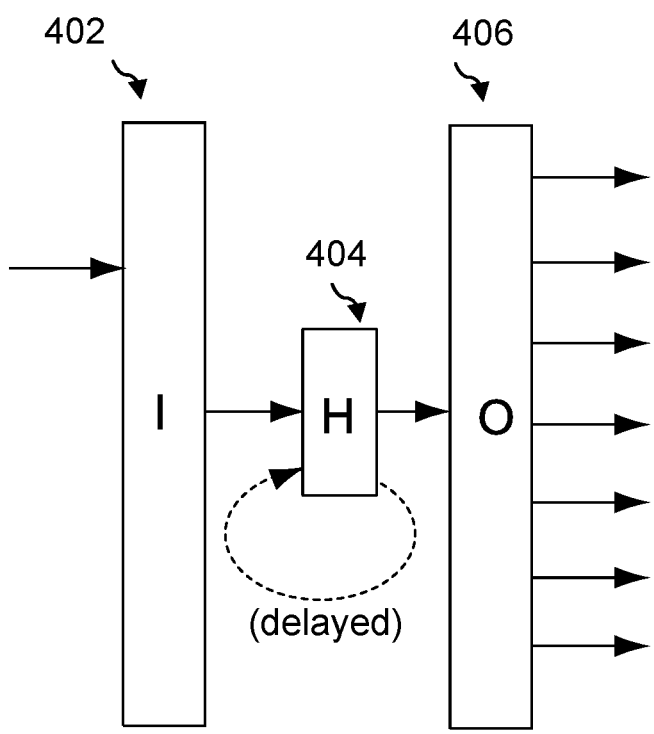
FIG. 4 illustrates a neural network for speech recognition according to embodiments of the present disclosure.

In one aspect, the neural network may be constructed with recurrent connections such that the output of the hidden layer of the network feeds back into the hidden layer again for the next set of inputs. Such a neural network is illustrated in FIG. 4. Each node of the input layer 402 connects to each node of the hidden layer 404. Each node of the hidden layer 404 connects to each node of the output layer 406. As illustrated, the output of the hidden layer 404 is fed back into the hidden layer for processing of the next set of inputs. A neural network incorporating recurrent connections may be referred to as a recurrent neural network (RNN).

In the case where an acoustic model uses a neural network, each node of the neural network input layer may represents an acoustic feature of an audio feature vector of acoustic features, such as those that may be output after the first pass of performing speech recognition, and each node of the output layer represents a score corresponding to a subword unit (such as a phoneme, triphone, senon, etc.) and/or associated states that may correspond to the sound represented by the audio feature vector. For a given input to the neural network, it outputs a number of potential outputs each with an assigned score representing a probability that the particular output is the correct output given the particular input. The top scoring output of an acoustic model neural network may then be fed into an HMM which may determine transitions between sounds prior to passing the results to a language model.

In the case where a language model uses a neural network, each node of the neural network input layer may represent a previous word and each node of the output layer may represent a potential next word as determined by the trained neural network language model. As a language model may be configured as a recurrent neural network which incorporates some history of words processed by the neural network, such as the network illustrated in FIG. 4, the prediction of the potential next word may be based on previous words in an utterance and not just on the most recent word. The language model neural network may also output weighted predictions for the next word.

Processing by a neural network is determined by the learned weights on each node input and the structure of the network. Given a particular input, the neural network determines the output one layer at a time until the output layer of the entire network is calculated.

Connection weights may be initially learned by the neural network during training, where given inputs are associated with known outputs. In a set of training data, a variety of training examples are fed into the network. Each example typically sets the weights of the correct connections from input to output to 1 and gives all connections a weight of 0. As examples in the training data are processed by the neural network, an input may be sent to the network and compared with the associated output to determine how the network performance compares to the target performance. Using a training technique, such as back propagation, the weights of the neural network may be updated to reduce errors made by the neural network when processing the training data. In some circumstances, the neural network may be trained with an entire lattice to improve speech recognition when the entire lattice is processed.

As noted above, during speech recognition, an ASR module 250/speech recognition engine 258 may utilize acoustic models 253 to determine possible phonemes or other phonetic units that match the incoming audio data feature vectors. The probable phonemes and related states/ state transitions may be formed into paths traversing a lattice of potential phonemes. Each path represents a progression of phonemes that potentially match the audio data represented by the audio feature vectors. One path may overlap with one or more other paths depending on the recognition scores calculated for each phoneme. Certain probabilities are associated with each transition from state to state. A cumulative path score may also be calculated for each path. This process of determining scores based on the audio feature vectors may be called acoustic modeling. When combining scores as part of the ASR processing, scores may be multiplied together (or combined in other ways) to reach a desired combined score or probabilities may be converted to the log domain and added to assist processing.

The speech recognition engine 258 may also compute scores of branches of the paths based on language models or grammars. Language modeling involves determining scores for what words are likely to be used together to form coherent words and sentences. Application of a language model may improve the likelihood that the ASR module 250 correctly interprets the speech contained in the audio data. For example, for an input audio sounding like "hello," acoustic model processing that returns the potential phoneme paths of "H E L O", "H A L O", and "Y E L O" may be adjusted by a language model to adjust the recognition scores of "H E L O" (interpreted as the word "hello"), "H A L O" (interpreted as the word "halo"), and "Y E L O" (interpreted as the word "yellow") based on the language context of each word within the spoken utterance.

Figure 5:
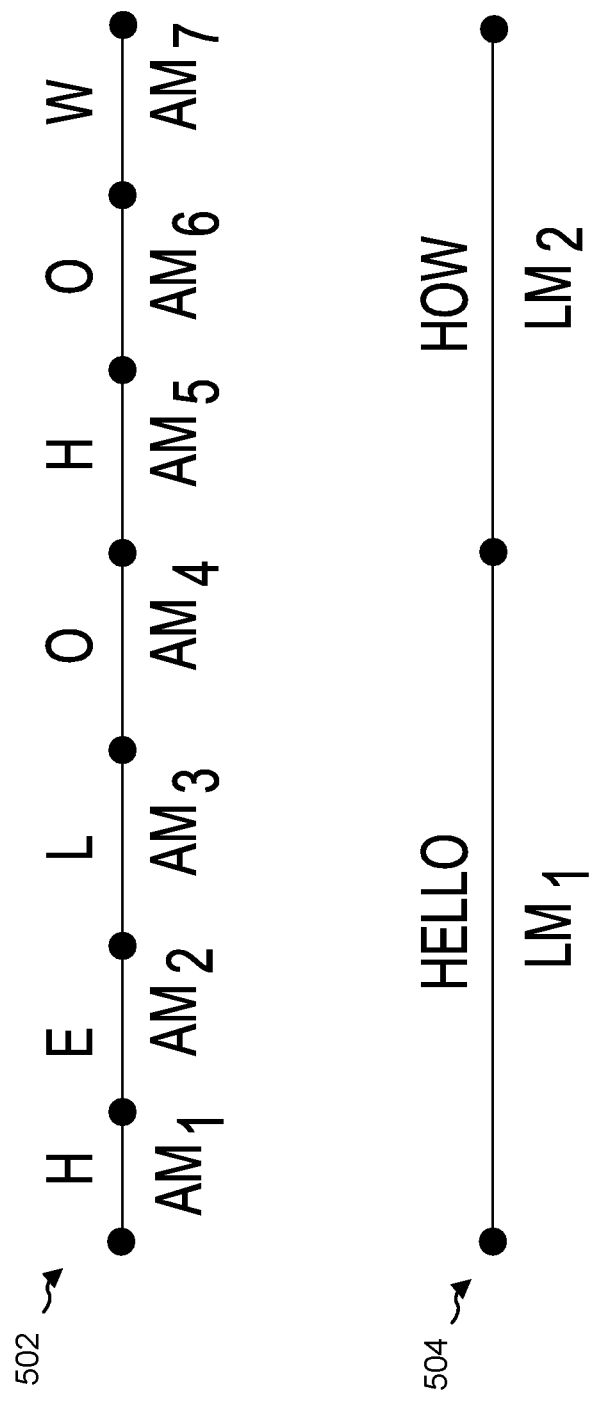
FIG. 5 illustrates phoneme processing and word processing according to embodiments of the present disclosure.

FIG. 5 illustrates the relationship between acoustic modeling and language modeling. As illustrated, each processed phoneme included in the path 502 is associated with an acoustic model score $AM_1$ through $AM_7$. The language model is then applied to associate each word in the path 504 with a language model score $LM_1$ or $LM_2$. As part of speech processing the system may combine different potential words determined by a language model into many potential word sequences, called hypotheses. Each hypotheses may be associated with a score, ranking it relative to other hypotheses. The score may be based on the input audio data, the processing from the acoustic model, the training of the language model, etc. An ASR component may output an N-best list of top scoring hypotheses, a single top scoring hypotheses or other forms of output (such as a lattice).

An audio device 110 may be configured with a number of components designed to improve the capture and processing of spoken commands. For example, the audio device 110 may be configured with a number of microphones in an array configuration to allow the device to determine a directional information relative to the audio data, such as determining where certain audio data is coming from based on when particular sounds are captured by different microphones of the array. The device may then use the direction information to boost audio signals from desired directions (namely, where a user is speaking from) and focus downstream processing on those directions while reducing or ignoring audio signals from undesired directions (e.g., directions with noise or without desired speech).

Figure 6:
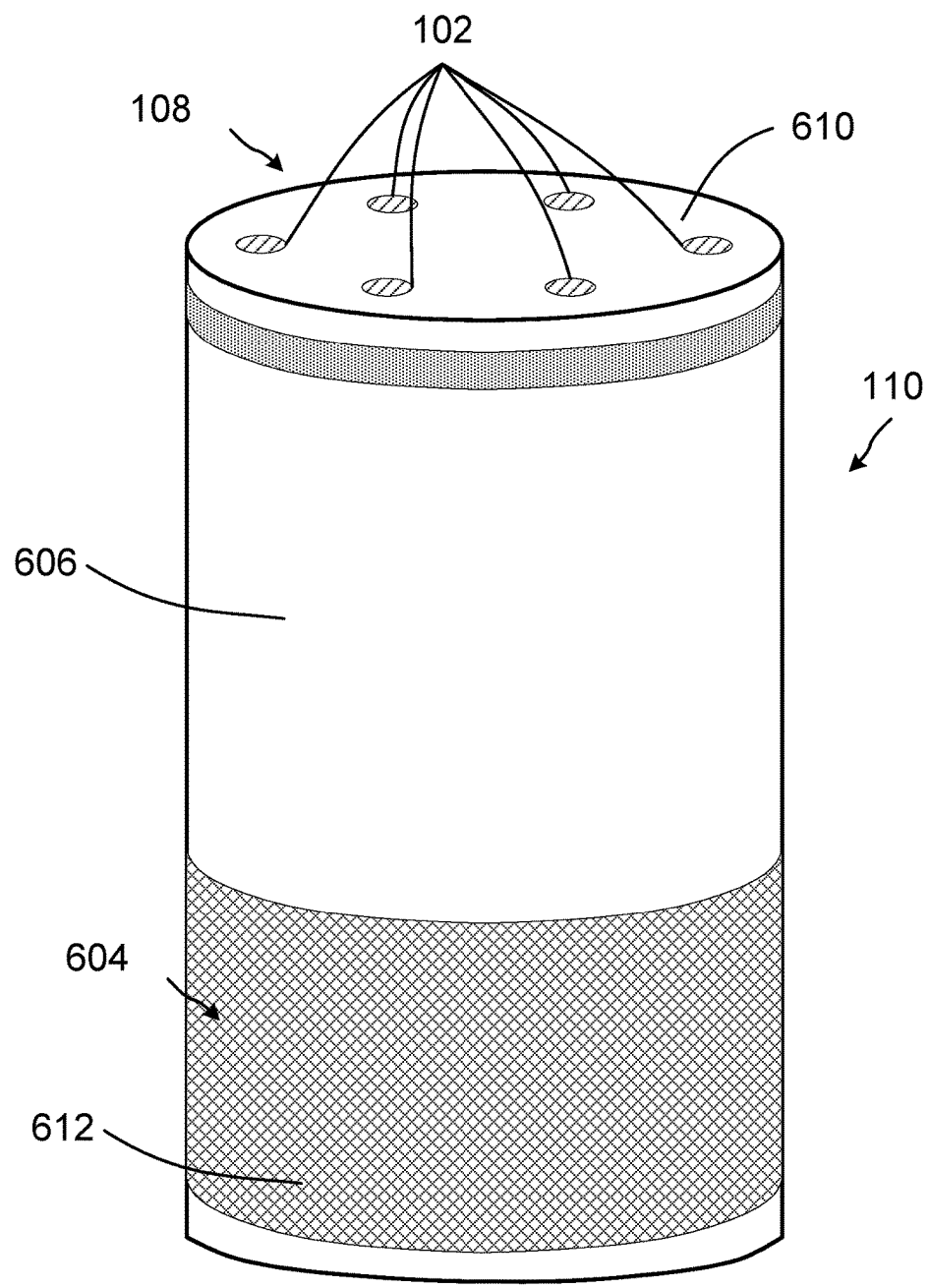
FIG. 6 is an illustration of an audio device that may be used according to embodiments of the present disclosure.

FIG. 6 illustrates details of microphone and speaker positioning in an example embodiment of an audio device 110. Although one particular configuration is illustrated in FIG. 6, many different configurations are possible. In this example, the audio device 110 is housed by a cylindrical body 606. The microphone array 108 comprises six microphones 102 that are laterally spaced from each other so that they can be used by audio beamforming components to produce directional audio signals. The microphones 102 may, in some instances, be dispersed around a perimeter of the device 110 in order to apply beampatterns to audio signals based on sound captured by the microphones 102. In the illustrated embodiment, the microphones 102 are positioned in a circle or hexagon on a top surface 610 of the cylindrical body 610. Each of the microphones 102 is omnidirectional in the described embodiment, and beamforming technology is used to produce directional audio signals based on signals form the microphones 102. In other embodiments, the microphones may have directional audio reception, which may remove the need for subsequent beamforming.

In various embodiments, the microphone array 108 may include greater or less than the number of microphones shown. For example, an additional microphone may be located in the center of the top surface 610 and used in conjunction with peripheral microphones for producing directionally focused audio signals.

The speaker 604 may be located at the bottom of the cylindrical body 606, and may be configured to emit sound omnidirectionally, in a 360 degree pattern around the audio device 110. For example, the speaker 604 may comprise a round speaker element directed downwardly in the lower part of the body 606, to radiate sound radially through an omnidirectional opening or gap 612 in the lower part of the body 606. The gap may be covered by a mesh or other permeable covering to enhance the visual appeal of the device 110 without impacting the ability of the device to output audio.

Using the microphone array 108 and the plurality of microphones 102 the audio device 110 may employ beamforming techniques to isolate desired sounds for purposes of converting those sounds into audio signals for speech processing by the system. Beamforming is the process of applying a set of beamformer coefficients to audio signal data to create beampatterns, or effective directions of gain or attenuation. In some implementations, these volumes may be considered to result from constructive and destructive interference between signals from individual microphones in a microphone array.

The audio device may include an audio processing module 2140 (illustrated in FIG. 21) that may include one or more audio beamformers or beamforming components that are configured to generate an audio signal that is focused in a direction from which user speech has been detected. More specifically, the beamforming components may be responsive to spatially separated microphone elements of the microphone array 108 to produce directional audio signals that emphasize sounds originating from different directions relative to the audio device 110, and to select and output one of the audio signals that is most likely to contain user speech. As discussed below, a classifier may be trained to determine if voice activity is detected and to select the audio signal/beam that is most likely to contain user speech.

Audio beamforming, also referred to as audio array processing, uses a microphone array having multiple microphones that are spaced from each other at known distances. Sound originating from a source is received by each of the microphones. However, because each microphone is potentially at a different distance from the sound source, a propagating sound wave arrives at each of the microphones at slightly different times. This difference in arrival time results in phase differences between audio signals produced by the microphones. The phase differences can be exploited to enhance sounds originating from chosen directions relative to the microphone array.

Beamforming uses signal processing techniques to combine signals from the different microphones so that sound signals originating from a particular direction are emphasized while sound signals from other directions are deemphasized. More specifically, signals from the different microphones are combined in such a way that signals from a particular direction experience constructive interference, while signals from other directions experience destructive interference. The parameters used in beamforming may be varied to dynamically select different directions, even when using a fixed-configuration microphone array.

A given beampattern may be used to selectively gather signals from a particular spatial location where a signal source is present. The selected beampattern may be configured to provide gain or attenuation for the signal source. For example, the beampattern may be focused on a particular user's head allowing for the recovery of the user's speech while attenuating noise from an operating air conditioner that is across the room and in a different direction than the user relative to a device that captures the audio signals.

Such spatial selectivity by using beamforming allows for the rejection or attenuation of undesired signals outside of the beampattern. The increased selectivity of the beampattern improves signal-to-noise ratio for the audio signal. By improving the signal-to-noise ratio, the accuracy of speech recognition performed on the audio signal is improved.

The processed data from the beamformer module may then undergo additional filtering or be used directly by other modules. For example, a filter may be applied to processed data which is acquiring speech from a user to remove residual audio noise from a machine running in the environment.

Figure 7:
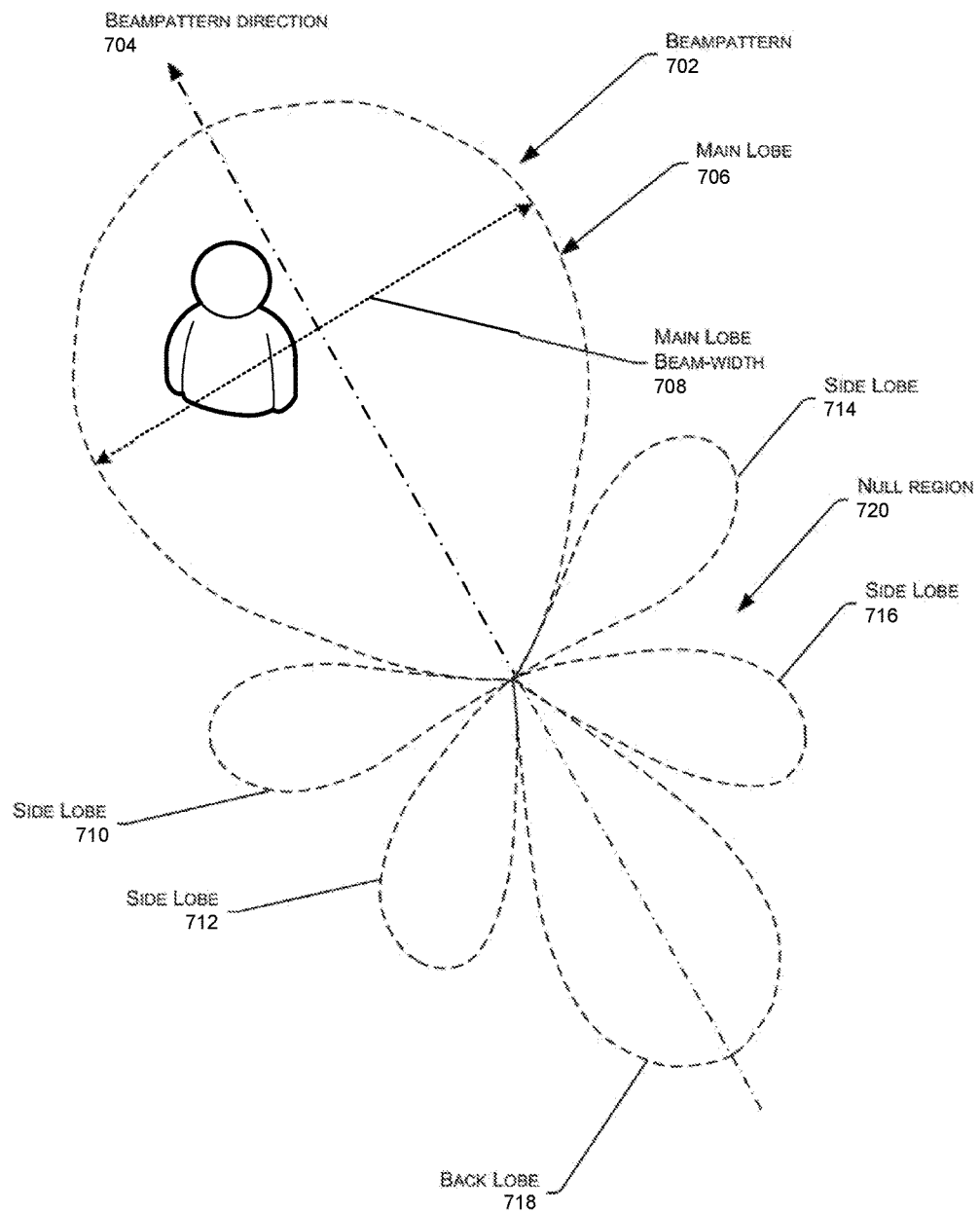
FIG. 7 is an illustration of beamforming according to embodiments of the present disclosure.

FIG. 7 illustrates a schematic of a beampattern 702 formed by applying beamforming coefficients to signal data acquired from a microphone array of the voice-controlled device 110 of FIG. 1. As mentioned above, the beampattern 702 results from the application of a set of beamformer coefficients to the signal data. The beampattern generates directions of effective gain or attenuation. In this illustration, the dashed line indicates isometric lines of gain provided by the beamforming coefficients. For example, the gain at the dashed line here may be +12 decibels (dB) relative to an isotropic microphone.

The beampattern 702 may exhibit a plurality of lobes, or regions of gain, with gain predominating in a particular direction designated the beampattern direction 704. A main lobe 706 is shown here extending along the beampattern direction 704. A main lobe beam-width 708 is shown, indicating a maximum width of the main lobe 706. In this example, the beampattern 702 also includes side lobes 710, 712, 714, and 716. Opposite the main lobe 706 along the beampattern direction 704 is the back lobe 718. Disposed around the beampattern 702 are null regions 720. These null regions are areas of attenuation to signals. In the example, the user 10 resides within the main lobe 706 and benefits from the gain provided by the beampattern 702 and exhibits an improved signal-to-noise (SNR) ratio or other audio quality metric compared to a signal acquired with non-beamforming. In contrast, if the user 10 were to speak from a null region, the resulting audio signal may be significantly reduced. As shown in this illustration, the use of the beampattern provides for gain in signal acquisition compared to non-beamforming. Beamforming also allows for spatial selectivity, effectively allowing the system to "turn a deaf ear" on a signal which is not of interest. Beamforming may result in directional audio signal(s) that may then be processed by other components of the device 110 and/or system 100.

While beamforming alone may increase a signal-to-noise (SNR) ratio of an audio signal, combining known acoustic characteristics of an environment (e.g., a room impulse response (RIR)) and heuristic knowledge of previous beampattern beam selection may provide an even better indication of a speaking user's likely location within the environment. In some instances, a device includes multiple microphones that capture audio signals that include user speech. As is known and as used herein, "capturing" an audio signal includes a microphone transducing audio waves of captured sound to an electrical signal and a codec digitizing the signal. The device may also include functionality for applying different beampatterns to the captured audio signals, with each beampattern having multiple lobes. By identifying lobes most likely to contain user speech using the combination discussed above, the techniques enable devotion of additional processing resources of the portion of an audio signal most likely to contain user speech to provide better echo canceling and thus a cleaner SNR ratio in the resulting processed audio signal.

To determine a value of an acoustic characteristic of an environment (e.g., an RIR of the environment), the device 110 may emit sounds at known frequencies (e.g., chirps, text-to-speech audio, music or spoken word content playback, etc.) to measure a reverberant signature of the environment to generate an RIR of the environment. Measured over time in an ongoing fashion, the device may be able to generate a consistent picture of the RIR and the reverberant qualities of the environment, thus better enabling the device to determine or approximate where it is located in relation to walls or corners of the environment (assuming the device is stationary). Further, if the device is moved, the device may be able to determine this change by noticing a change in the RIR pattern. In conjunction with this information, by tracking which lobe of a beampattern the device most often selects as having the strongest spoken signal path over time, the device may begin to notice patterns in which lobes are selected. If a certain set of lobes (or microphones) is selected, the device can heuristically determine the user's typical speaking position in the environment. The device may devote more CPU resources to digital signal processing (DSP) techniques for that lobe or set of lobes. For example, the device may run acoustic echo cancellation (AEC) at full strength across the three most commonly targeted lobes, instead of picking a single lobe to run AEC at full strength. The techniques may thus improve subsequent automatic speech recognition (ASR) results as long as the device is not rotated or moved. And, if the device is moved, the techniques may help the device to determine this change by comparing current RIR results to historical ones to recognize differences that are significant enough to cause the device to begin processing the signal coming from all lobes approximately equally, rather than focusing only on the most commonly targeted lobes.

By focusing processing resources on a portion of an audio signal most likely to include user speech, the SNR of that portion may be increased as compared to the SNR if processing resources were spread out equally to the entire audio signal. This higher SNR for the most pertinent portion of the audio signal may increase the efficacy of the speech-recognition engine 258 when performing speech recognition on the resulting audio signal.

To determine if incoming audio includes speech the system may employ energy based or acoustic model based voice activity detection (VAD) techniques. Such techniques may determine whether speech is present in an audio input based on various quantitative aspects of the audio input, such as the spectral slope between one or more frames of the audio input; the energy levels (such as a volume, intensity, amplitude, etc.) of the audio input in one or more spectral bands; zero-crossing rate; the signal-to-noise ratios of the audio input in one or more spectral bands; or other quantitative aspects. These factors may be compared to one or more thresholds to determine if an break in speech has occurred that qualifies as a beginpoint/endpoint. Such thresholds may be set according to user input, or may be set by a device. In some embodiments, the beginpointing/endpointing may be further configured to determine that the audio input has an energy level satisfying a threshold for at least a threshold duration of time. In such embodiments, high-energy audio inputs of relatively short duration, which may correspond to sudden noises that are relatively unlikely to include speech, may be ignored. The system may compare the energy level to the energy level threshold (and optionally to the threshold duration) to determine whether the energy level threshold is met.

In certain embodiments, Hidden Markov Model (HMM) or Gaussian Mixture Model (GMM) techniques may be applied to compare the audio input to one or more acoustic models in speech storage, which acoustic models may include models corresponding to speech, noise (such as environmental noise or background noise), or silence/non-speech. Still other techniques may be used to determine whether speech begins/ends in the input audio data.

Figure 8:
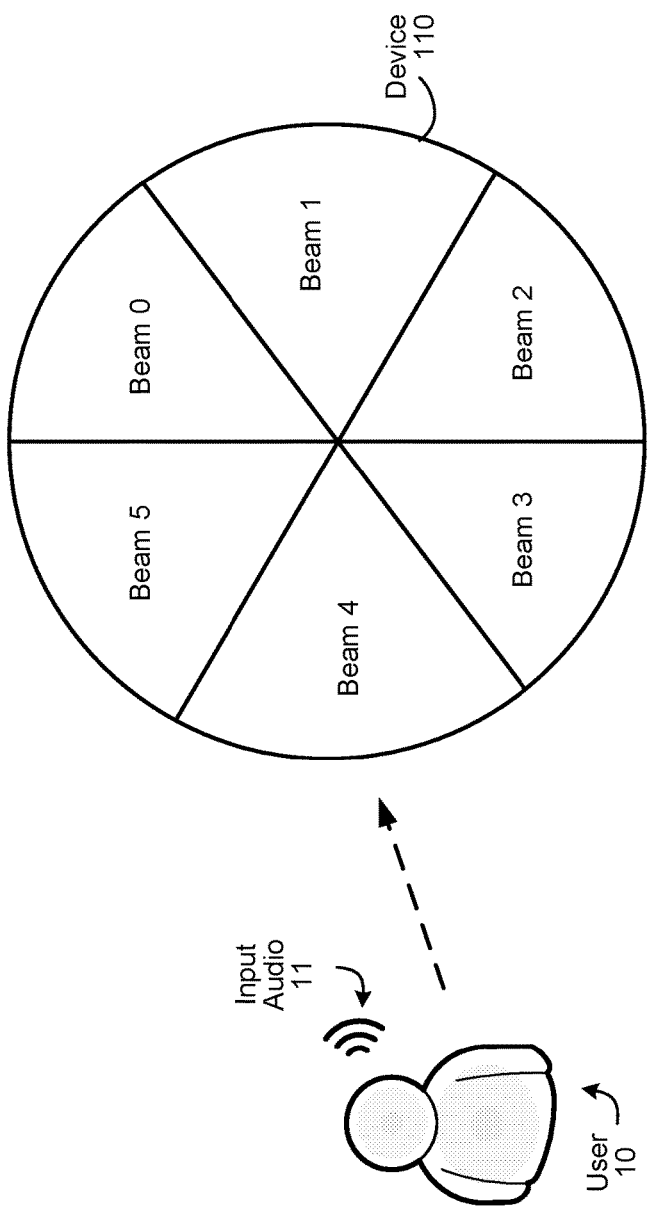
FIG. 8 is an illustration of received audio relative to beam positions of a device according to embodiments of the present disclosure.

Audio data captured by a device 110 may be divided into beams or other portions of audio data corresponding to specific microphones, specific beams output from a beamformer or other directional divisions. Thus, for any particular moment in time t, there may be multiple beams worth of audio data (e.g., one feature vector for each beam for time t) all corresponding to time t. For example, as shown in FIG. 8, a device 110 may be configured to capture audio and determine audio data for six beams, illustrated as beams 0-5. Thus, if a user 10 is speaking input audio 11, the input audio will be captured simultaneously by the microphones of the microphone array of device 110 and will result in different beams of audio data. Thus for audio frame t, each beam will produce an audio feature vector worth of audio data, for example audio feature vector t(0), audio feature vector t(1), audio feature vector t(2), audio feature vector t(3), audio feature vector t(4) and audio feature vector t(5) where each audio feature vector corresponds to the same time frame but corresponds to different beams. In the example of FIG. 8, the audio data from beam 4 (e.g., audio feature t(4)) will likely have the best audio data corresponding to the input audio 11 due to the user being positioned, relative to the device, closest to beam 4.

For speech processing, it is desirable to select and process the beam with the best representation of the spoken utterance. This may be done by selecting the beam with the highest SNR, SINR (signal-to-interference plus noise) ratio, or other signal quality metric. As noted above, however, beam selection may not occur until the system has determined that voice activity has been detected in the input audio. Certain systems may perform VAD separately from beam selection. Offered is a system that trains a machine learning model, such as a neural network classifier, to determine whether voice activity is detected and what beam or geometric position the voice activity originates from.

Various machine learning techniques may be used to determine a classifier to determine voice activity and beam selection. Such techniques may include, for example, neural networks (such as deep neural networks and/or recurrent neural networks), inference engines, trained classifiers, etc. Examples of trained classifiers include Support Vector Machines (SVMs), neural networks, decision trees, AdaBoost (short for "Adaptive Boosting") combined with decision trees, and random forests. Focusing on SVM as an example, SVM is a supervised learning model with associated learning algorithms that analyze data and recognize patterns in the data, and which are commonly used for classification and regression analysis. Given a set of training examples, each marked as belonging to one of two categories, an SVM training algorithm builds a model that assigns new examples into one category or the other, making it a non-probabilistic binary linear classifier. More complex SVM models may be built with the training set identifying more than two categories, with the SVM determining which category is most similar to input data. An SVM model may be mapped so that the examples of the separate categories are divided by clear gaps. New examples are then mapped into that same space and predicted to belong to a category based on which side of the gaps they fall on. Classifiers may issue a "score" indicating which category the data most closely matches. The score may provide an indication of how closely the data matches the category.

In order to apply the machine learning techniques, the machine learning processes themselves need to be trained. Training a machine learning component such as, in this case, one of the first or second models, requires establishing a "ground truth" for the training examples. In machine learning, the term "ground truth" refers to the labels in the training data representing the truth associated with the particular training example, thus instructing the model how it should classify the data associated with the example when encountered during runtime. Thus training examples and corresponding ground truths are used to ensure the accuracy of a training set's classification for supervised learning techniques. Various techniques may be used to train the models including backpropagation, statistical learning, supervised learning, semi-supervised learning, stochastic learning, or other known techniques. Many different training example utterances may be used during training.

Encoding is a general technique for projecting a sequence of features into a vector space. One goal of encoding is to project data points into a multi-dimensional vector space so that various operations can be performed on the vector combinations to determine how they (or the data they contain) related to each other. Example of such vectors include audio feature vectors or other example data vectors. It can be valuable to encode certain features into a vector space to perform various operations.

In mathematical notation, given a sequence of feature data values $x_1, \ldots x_n, \ldots x_N$, with $x_n$ being a D-dimensional vector, an encoder $E(x_1, \ldots x_N)=y$ projects the feature sequence to y, with y being a F-dimensional vector. F is a fixed length of the vector and is configurable depending on user of the encoded vector and other system configurations. For example, F may be between 100 and 1000 values for use in speech processing, but any size may be used. Any particular encoder 950 will be configured to output vectors of the same size, thus ensuring a continuity of output encoded vector size from any particular encoder 950 (though different encoders may output vectors different fixed sizes). The value y may be called an embedding of the sequence $x_1, \ldots x_N$. The length of $x_n$ and y are fixed and known a-priori, but the length of N of feature sequence $x_1, \ldots x_N$ is not necessarily known a-priori. The encoder E may be implemented as a recurrent neural network (RNN), for example as an long short-term memory RNN (LSTM-RNN) or as a gated recurrent unit RNN (GRU-RNN). An RNN is a tool whereby a network of nodes may be represented numerically and where each node representation includes information about the preceding portions of the network. For example, the RNN performs a linear transformation of the sequence of feature vectors which converts the sequence into a fixed size vector. The resulting vector maintains features of the sequence in reduced vector space that can otherwise be arbitrarily long. The output of the RNN after consuming the sequence of feature data values is the encoder output. There are a variety of ways for the RNN encoder to consume the encoder output, including but not limited to:

linear, one direction (forward or backward), bi-linear, essentially the concatenation of a forward and a backward embedding, or tree, based on parse-tree of the sequence, In addition, an attention model can be used, which is another RNN or DNN that learns to "attract" attention to certain parts of the input. The attention model can be used in combination with the above methods of consuming the input.

Figure 9:
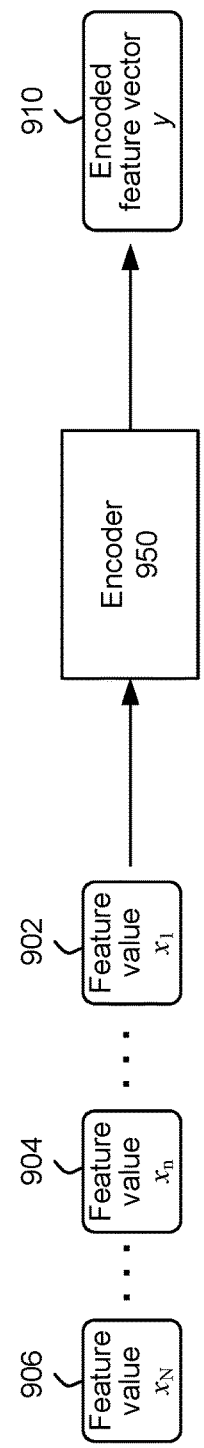
FIG. 9 illustrates operation of an encoder according to embodiments of the present disclosure.

FIG. 9 illustrates operation of an encoder 950. The input feature value sequence, starting with feature value $x_1$ 902, continuing through feature value $x_n$ 904 and concluding with feature value $x_N$ 906 is input into the encoder 950. The RNN encoder 950 may process the input feature values as noted above. The encoder 950 outputs the encoded feature vector y 910, which is a fixed length feature vector of length F. An encoder such as 950 may be used with speech processing.

For ASR processing the base input is typically audio data in the form of audio feature vectors corresponding to audio frames. As noted above, typically acoustic features (such as log-filter bank energies (LFBE) features, MFCC features, or other features) are determined and used to create audio feature vectors for each audio frame. It is possible to feed audio data into an RNN, using the amplitude and (phase) spectrum of a fast-Fourier transform (FFT), or other technique that projects an audio signal into a sequence of data. If alignment of the acoustic features exists, it may be added as an additional input. The alignment information can be either provided as a one-hot vector using the Viterbi alignment, or as a probability distribution over all possible states using a Baum-Welch alignment. Alignments can be provided at the level of senons, phonemes, or any other level suitable for the application.

The encoder RNN may be trained using known techniques, for example the stochastic gradient descent (SGD) method with the backpropagation-through-time (BTT) algorithm to propagate an error signal through the sequence thereby learning the parameters of the encoder network.

A classifier is a known machine learning based tool to classify inputs into certain configured classes. A classifier may be trained in a manner to use the encoded vectors discussed above. Thus, a classifier may be trained to classify an input set of features $x_1, \ldots x_N$ into a fixed number of classes 1 . . . C (where C may be two, and the classifier may be configured to simply classify an input feature vector into one category or the other). To configure a classifier to operate on RNN encoded data a DNN with a softmax layer and an RNN-encoder may be used. Depending on the output size a hierarchical softmax layer can be used as known in the art. The DNN takes the RNN-encoder output as input and produces a probability distribution over all classes where the highest scoring class may be selected. In mathematical notation, given a sequence $x_N$, and an encoder E, the classifier H may be expressed as:

$$H_E(x_1, \ldots x_N) := \mathrm{argmax}\ p(c|E(x_1, \ldots x_N)) \quad (1)$$

where p(c|y) is implemented as a DNN.

Encoder RNN E and classifier H may be trained jointly using the SGD method with the cross-entropy objective function and the backpropagation-through-time (BTT) algorithm. Instead of SGE, any other machine learning technique that applies to learning neural networks can be applied to BTT. The encoder E may be trained on sample sequences of feature data. The classifier H may be trained on example feature vectors output together with encoder E. Known machine learning techniques may be used to train H and E, for example using a gradient feedback technique to update parameters/weights in H and E.

The above encoding technique may be used to improve a number of speech processing tasks. In particular, it may be used to encode audio data or other data such as beam origination data (indicating an origination beam for speech in a training data example), position origination data (indicating an origination position relative to a microphone or array for speech in a training data example), or other data such as whether a particular frame corresponding to the encoded vector includes speech.

A frame-wise voice activity detector/beam selector may have the form $H(n; x_1, \ldots x_{n+d})$ and may predicts the probability of Pr(n-th frame includes speech| $x_1 \ldots x_{n+d}$). H can be implemented in different ways, a common state-of-the-art choice is to implement H as a (deep) neural network (DNN) or recurrent neural network (RNN). H may also be implemented to use the encoded reference audio data vector as an input. Thus, the system may use the encoder approach to project the anchor segment into a fixed size vector space, which is then fed as an additional feature into the frame-wise speech detector:

$$H(n; x_1 \ldots x_{n+d}, E(x'_1 \ldots x'_m)) \quad (2)$$

where H considers as inputs the encoded input audio feature vectors for the particular audio frame to be classified/labeled as well as a certain number of audio frames before the particular audio frame and a certain number of audio frames after the particular audio frame (called short context data as explained below). Thus, a sliding window of audio frames may be used to provide some context to the classifier H when labeling any particular audio frame.

The particular frame's worth of audio data may include audio data from multiple beams or multiple microphones. Thus, for frame n, the audio feature vectors considered for frame n will be the feature vectors for all beams 0 through B−1 (where B is the number of beams) corresponding to time n.

H may be implemented either as a DNN or RNN (can be an LSTM-RNN or GRU-RNN or any other RNN variant). H and E may be trained jointly using the method of stochastic gradient descent (SGD) with the backpropagation-through-time (BTT) algorithm or any other suitable learning algorithm. At training time frames containing desired speech are marked as positive examples along with the best beam, whereas other frames are marked as negative examples (i.e., corresponding to non-desired speech or non-speech).

To train a classifier to perform VAD/beam selection a number of training examples may be obtained. Each training example may include audio data for a particular utterance as captured by a microphone array. Each training example may therefore include audio data including audio feature vectors. Such audio feature vectors may be made of a sequence of features derived from an acoustic signal. Typical features include log filterbank energies (LFBE), mel-frequency cepstral coefficients (MFCCs), perceptual linear prediction (PLP), or any other meaningful features that can be derived from the audio signal including the digitalized audio signal itself. As noted, multiple audio feature vectors worth of audio data may be obtained for one particular time period, where each audio feature vector corresponds to a microphone of the microphone array or a beam of the particular device that captured the utterance of the training example. Thus, if the array has B beams/mics, there will be B audio feature vectors for each time period t.

Further, each training example may also include ground truth data which gives the classifier the "answer" that the classifier would be expected to arrive at if it encountered the training data during runtime. The system may then input many such training examples to train the classifier according to machine learning techniques. The ground truth data for the training examples may include a label as to whether a particular audio frame corresponds to speech or no speech, and if corresponding to speech, which is the beam/microphone that is best representation of the speech for that particular time period. Thus, a training example may include a recording of audio of some length where the length is variable, for example several seconds to a minute (or some other length). The audio data for the training example may include, for each beam, audio frames corresponding to the length of the utterance. Each audio frame (or audio feature vector) may also be labeled as including speech or not including speech as well as the beam that best represents the speech, on a frame by frame basis. That is, the "best" beam may change from frame t to frame t+1 depending on the source audio and the training example. The indicator of the best beam may simply be a beam index (e.g., a number from 0 to B−1) representing the beam). As the training examples are known ahead of time, the ground truth data is known as well and so may be fed in as input for classifier training purposes.

Figure 10:
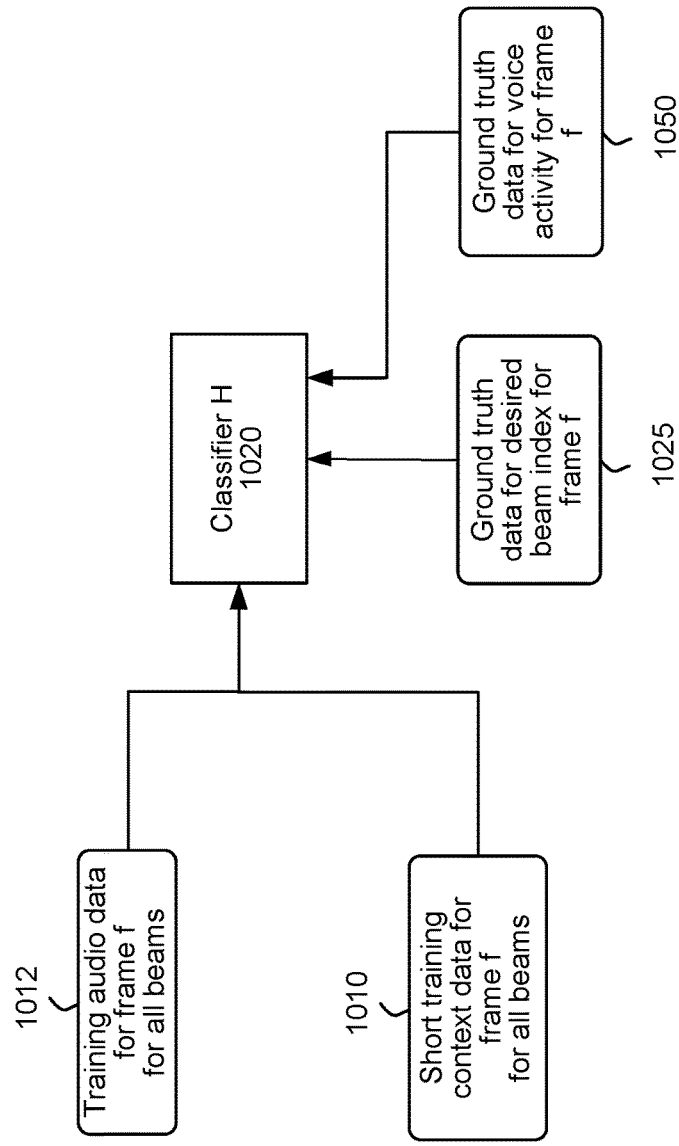
FIG. 10 illustrates training a classifier to determine a desired beam according to embodiments of the present disclosure.

As an example, FIG. 10 illustrates training a classifier 1020 for performing VAD and beam selection. For each training audio frame f, the training audio data 1012 (including audio feature vectors) for frame f is input into the classifier. As noted, the training audio data 1012 for frame f may include multiple audio feature vectors for each beam corresponding to time frame f. The ground truth data of the desired beam index 1025 for frame f is also input into the classifier 1020 along with the ground truth data for voice activity 1050 for frame f. As noted the ground truth data may include, for each training audio data segment, a first indicator 1050 of whether speech is found in frame f, a second indicator 1025 as to what the best beam or microphone for frame f is, or other data. Further, for frame f additional short training context data 1010 may be considered during training. The short training context data 1010 may include further audio feature vectors related to the frames just before or just after frame f (for example, audio data for frames f−1, f−2, etc. and/or frames f+1, f+2, etc.). The short training context data 1010 allows the system to put the audio for frame f into context by considering a sliding window around frame f when training the classifier. The short training context data 1010 may include audio data for all the beams for the other frames. The training audio data 1012, short training context data 1010 and ground truth data 1025 may be encoded, for example by encoder 950, to be put into a vector form more easily processed by the classifier 1020.

The classifier 1020 may be trained using a number of different techniques including a cross entropy loss function, mean square error, KL distance, or the like. For classifying the beam index 1130 (shown in FIG. 11), cross entropy may work well.

By training the classifier 1020 using in the above manner, the classifier will be trained to recognize voice activity and select the best beam at runtime.

Figure 11:
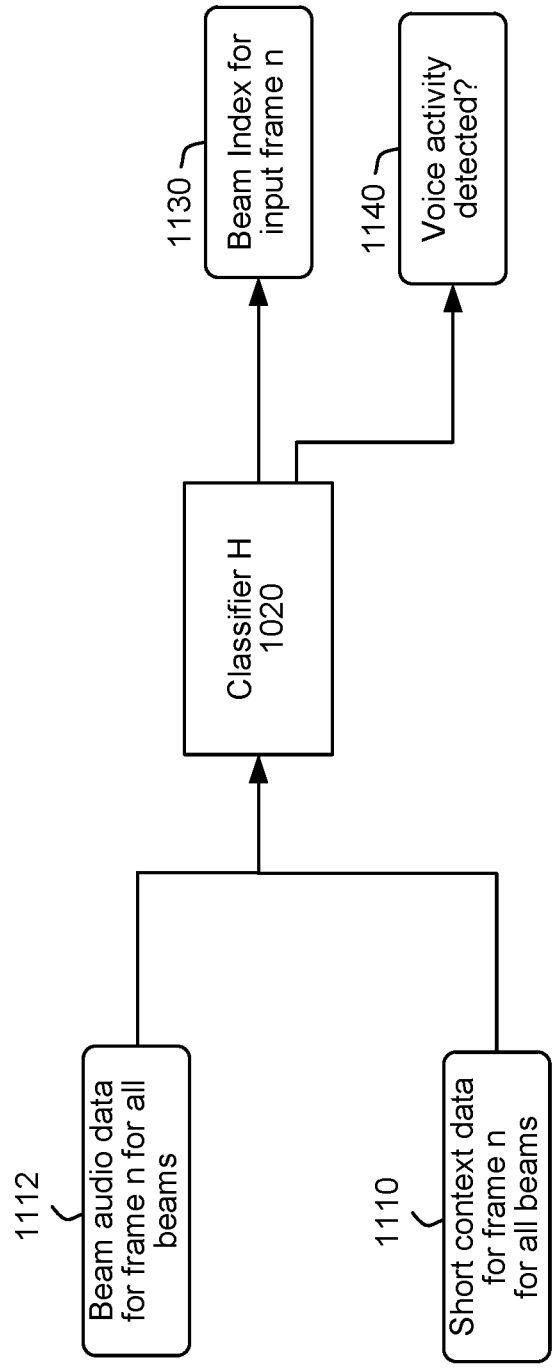
FIG. 11 illustrates using a classifier as trained in FIG. 10 to determine a desired beam from input audio according to embodiments of the present disclosure.

For example, as shown in FIG. 11, at runtime the classifier 1020 may be used to process input beam audio data 1112 captured by a device 110 and corresponding to an utterance spoken by user 10. The audio data 1112 may be processed on a frame-by-frame basis to classify whether a particular frame includes speech and which beam corresponds to the best beam representing the speech. Thus, as shown in FIG. 11, for frame n, the input beam audio data 1112 is fed into the classifier 1020 along with the short context data for frame n 1110. The classifier 1020 then determines whether frame n includes voice activity (and may output an indicator 1140 of whether voice activity was detected) as well as which beam best represents the speech, as indicated by the output beam index 1130 (e.g., a number from 0 to B−1). The indication of the output beam index 1130 may include may be in the form of an output vector, for example a length B vector where one entry in the vector (the one corresponding to the selected beam) is a 1 and the other entries (corresponding to the unselected beams) are 0. Other forms of indication are also possible.

Figure 12:
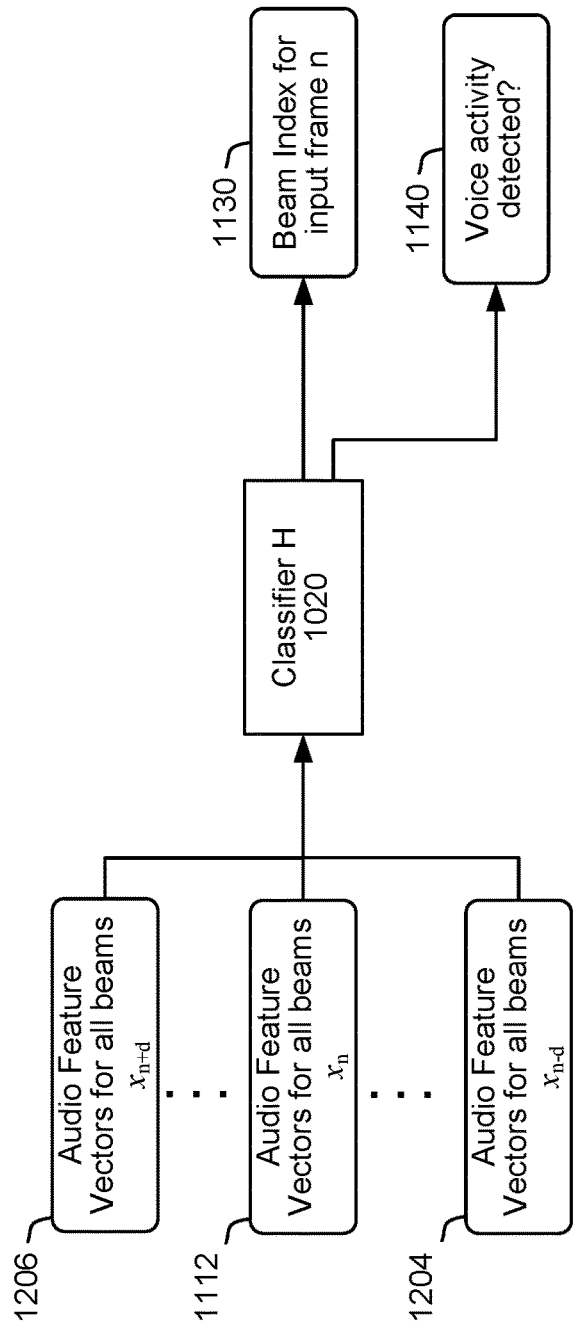
FIG. 12 illustrates the use of short audio context data to determine a desired beam from input audio according to embodiments of the present disclosure.

As an example of the short context data for the frames, FIG. 12 shows the sliding window of audio feature vectors being input into the classifier 1020. As shown, for processing audio frame n, the audio feature vectors ($x_n$) for all beams for audio frame n 1112 are input into the classifier 1020. Also input are the audio feature vectors corresponding to the frames just before frame n (e.g., frames 1204 up to 1112) and the audio feature vectors corresponding to the frames just after frame n (e.g., frames 1112 to 1206). As can be seen, the window of frames goes from frame n−d to frame n+d where d is the range on either side of n and is configurable. (Further, although the frame window is illustrated as being symmetric, it may be asymmetric as well depending on system configuration). Thus, at runtime the classifier 1020 may consider all the frames within the frame window surrounding frame n to determine whether voice activity is detected in frame n (1140) and which beam is the best representation of the speech of frame n (1130).

Figure 13:
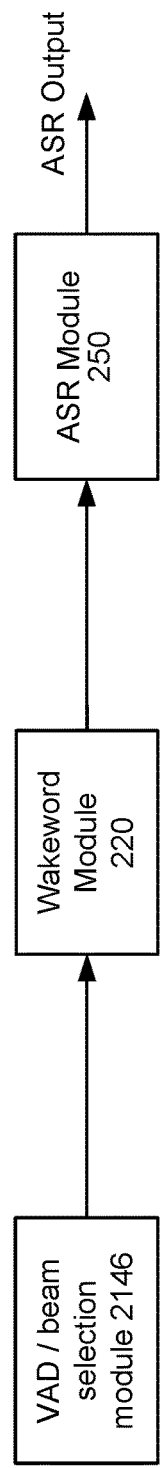
FIG. 13 illustrates portions of a speech processing pipeline according to embodiments of the present disclosure.

Thus, as shown in FIG. 13, at runtime the classifier 1020 may be operated by a VAD/beam selection module 1046, which inputs audio data and outputs an indicator of voice activity and an indicator of a selected beam (which may correspond to a microphone of a microphone array). The VAD/beam selection module 1046 may then forward the audio data corresponding to that beam to a downstream component, such as a wakeword module 220, which will analyze the audio data from the selected beam to determine whether the wakeword is detected, and if it is, will forward the audio data from the selected beam to an ASR module 250 for further processing.

Figure 14:
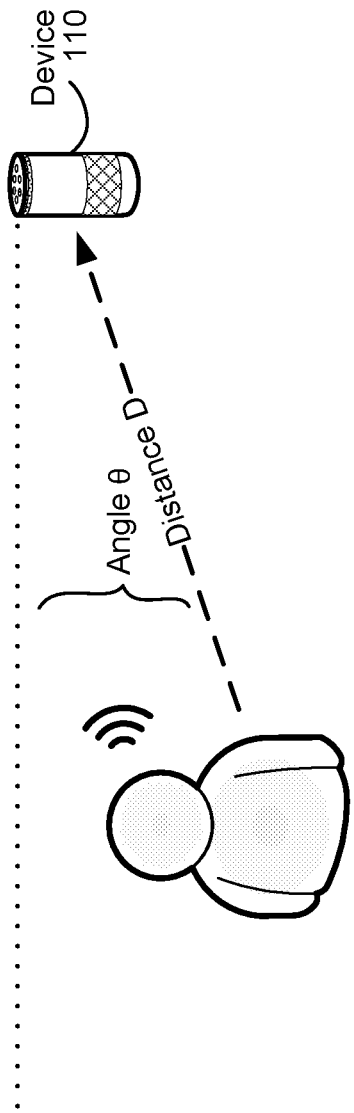
FIG. 14 is an illustration of received audio relative position relative to a device according to embodiments of the present disclosure.
Figure 15:
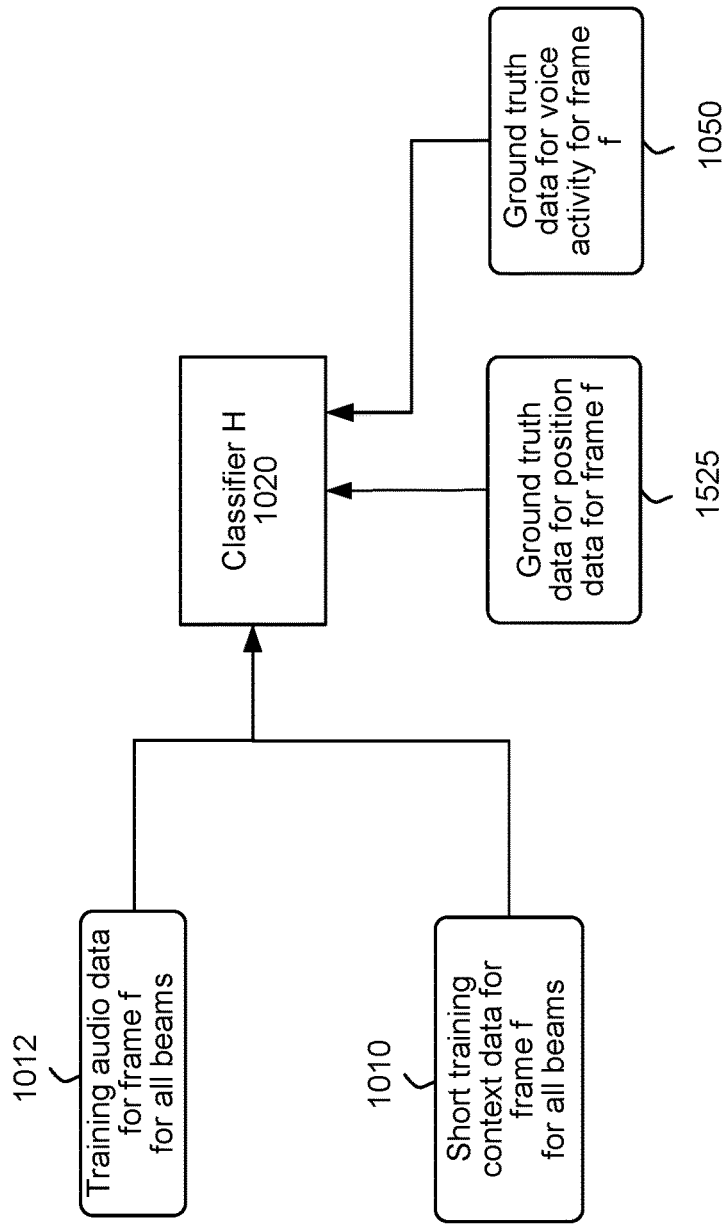
FIG. 15 illustrates training a classifier to determine a source position of desired audio according to embodiments of the present disclosure.

In addition to training a classifier with training data corresponding to a selection of a "best" beam, a classifier may be trained with position information regarding where the source of audio was (for example relative to a capturing device) when the training audio data was captured. For example, as shown in FIG. 14, for a training instance, the user's position relative to a capturing device 110 may be known by determining, for example, the user's distance D from the device as well as the angle θ around a 360 circle relative to the device (sometimes called the azimuth) thus being polar coordinate data. The position data may also include X-Y-Z coordinate data, GPS data, or other position data such as information about detected wireless signals at the user position, geo-sensing data, or the like. This detailed position data may be used to train the classifier 1020 so that at runtime the classifier 1020 may be able to classify the position of the detected audio, which may be useful for downstream components. As can be appreciated, a beam index is one type of position data, where the beam index identifies an azimuth range where the speech source is relative to the device. Further position data may include a microphone identifier which identifies a microphone within an array that is associated with a strongest received speech signal As an example, FIG. 15 illustrates training a classifier 1020 for performing VAD and position estimation. For each training audio frame f, the training audio data 1012 (including audio feature vectors) for frame f is input into the classifier. As noted, the training audio data 1012 for frame f may include multiple audio feature vectors for each beam corresponding to time frame f. The ground truth data 1525 and 1050 for frame f is also input into the classifier 1020. As noted the ground truth data may include, for each training audio data segment, a first indicator 1050 of whether speech is found in frame f, a second indicator 1525 as to what the position data is for speech seen in frame f, or other data. Further, for frame f additional short training context data 1010 may be considered during training. The training audio data 1012, short training context data 1010 and ground truth data 1525/1050 may be encoded, for example by encoder 950, to be put into a vector form more easily processed by the classifier 1020.

The classifier 1020 may be trained using a number of different techniques including a cross entropy loss function, mean square error loss function, KL distance, or the like. For classifying the position data 1630 (shown in FIG. 16), an L2 loss technique may work well. The position data 1630 may be in the form a vector including the position data configured for output. For example, if the classifier 1020 is configured to output position data in two-dimensional polar coordinates, the output vector may be a two entry vector with one entry corresponding to estimated azimuth and another entry corresponding to the estimated distance from the device. If the classifier 1020 is configured to output position data in three-dimensional X-Y-Z coordinates, the output vector may be a three entry vector with one entry corresponding to an estimated X position, another entry corresponding to an estimated Y position, and another entry corresponding to an estimated Z position (where the X-Y-Z coordinates may be relative to the device).

By training the classifier 1020 using in the above manner, the classifier will be trained to recognize voice activity and classify the estimated source location of the detected speech.

Figure 16:
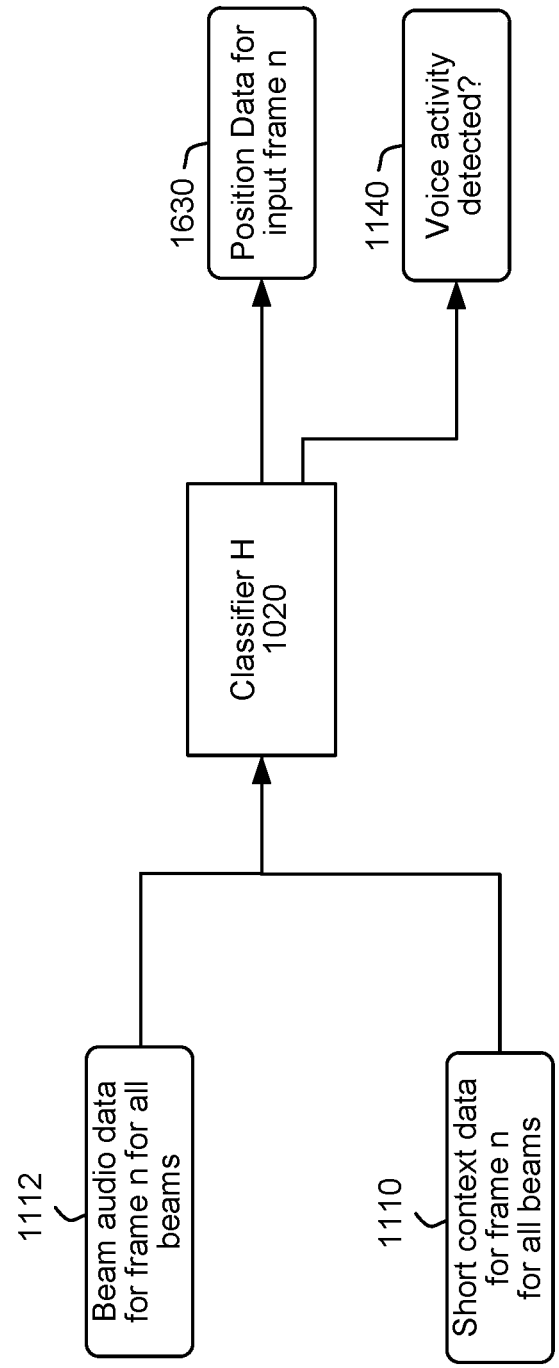
FIG. 16 illustrates using a classifier as trained in FIG. 15 to determine a source position of desired received audio from input audio according to embodiments of the present disclosure.

For example, as shown in FIG. 16, at runtime the classifier 1020 may be used to process input beam audio data 1112 captured by a device 110 and corresponding to an utterance spoken by user 10. The audio data 1112 may be processed on a frame-by-frame basis to classify whether a particular frame includes speech and the estimated position data corresponding to the detected speech. Thus, as shown in FIG. 16, for frame n, the input beam audio data 1112 is fed into the classifier 1020 along with the short context data for frame n 1110. The classifier 1020 then determines whether frame n includes voice activity (and may output an indicator 1140 of whether voice activity was detected) as well as an indicator of the estimated position of the detected speech 1630 (e.g., coordinates, distance, angle, or the like).

The information about the estimated position may be passed from a VAD/beam selection module 2146 (which may operate the classifier of FIGS. 15 and 16) to a downstream component such as a wakeword module 220 or ASR module 250 or other component that may use the position data in some fashion.

Figure 17:
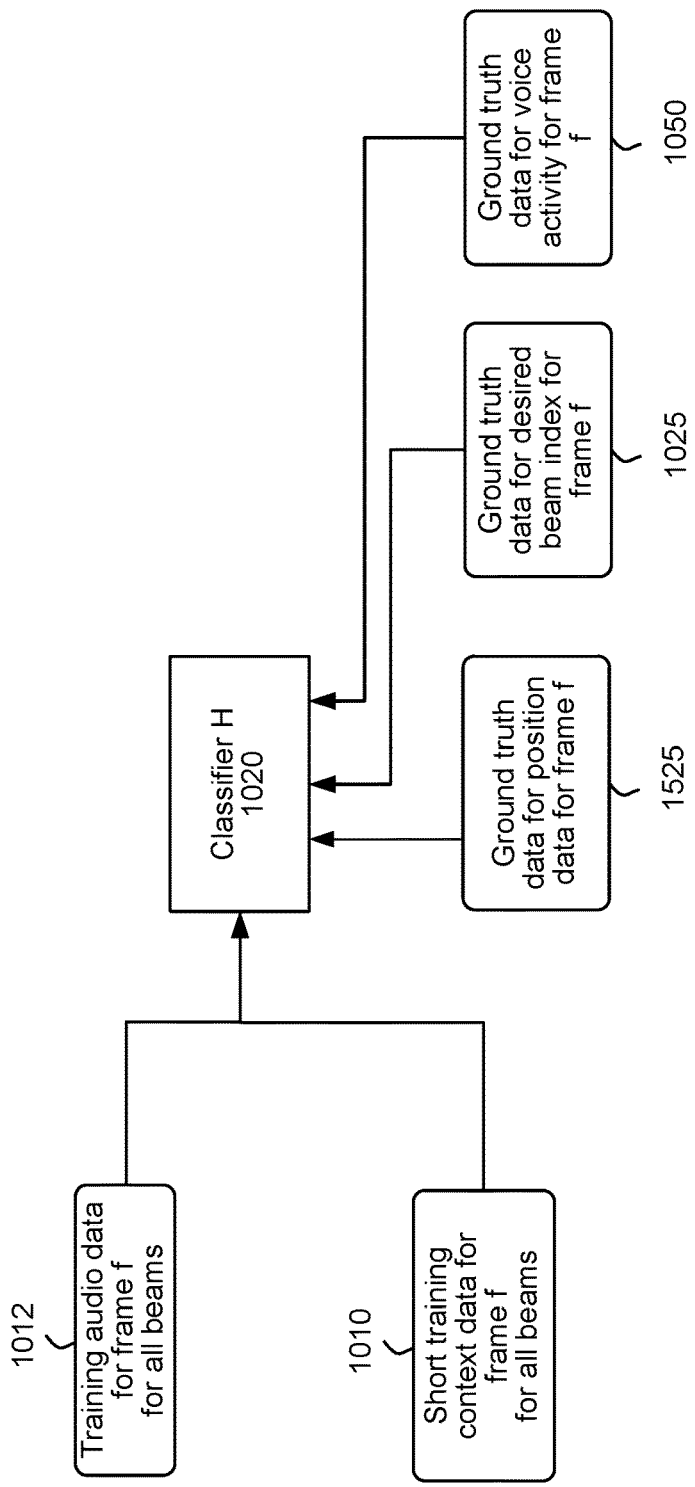
FIG. 17 illustrates training a classifier to determine a source position of desired audio and a desired beam according to embodiments of the present disclosure.
Figure 18:
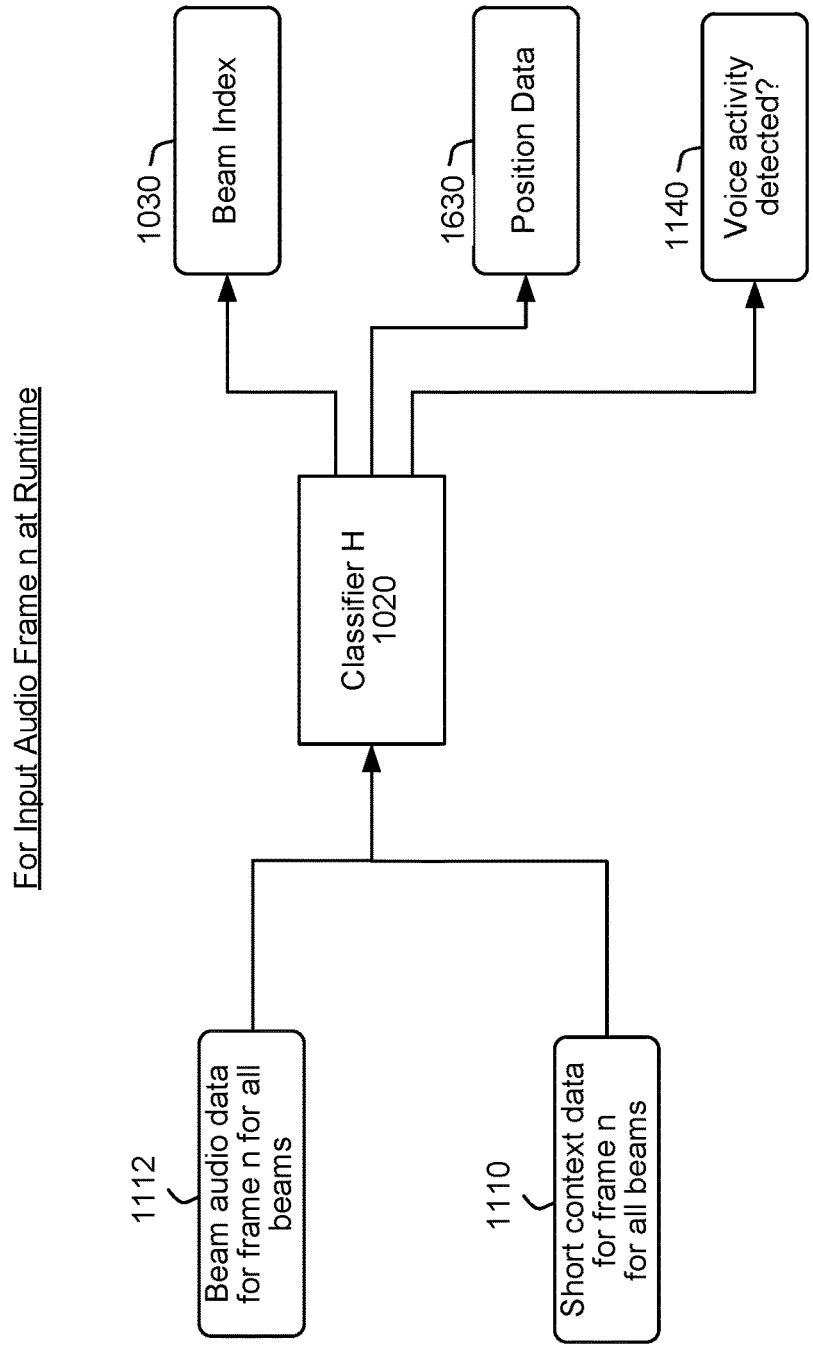
FIG. 18 illustrates using a classifier as trained in FIG. 17 to determine a source position of desired received audio and a desired beam from input audio according to embodiments of the present disclosure.

Further, the classifier 1020 may be trained to output both the beam index and/or other the position data. The classifier may be trained as described above, including ground truth data for voice activity and both position considerations, as illustrated in FIG. 17. Then at runtime, as illustrated in FIG. 18, the classifier 1020 may be configured to output an indicator of voice activity (1140), an indicator of the best beam (1030) and an indicator of position data (1630). The same classifier 1020 may determine the indicator of the best beam (1030) and the indicator of position data (1630) where different indicators may be taken from different layers of the neural network classifier 1020. Any of the classifiers 1020 described herein may also be configured to operate at runtime on incoming audio data where the classifier 1020 is continually determining position data and whether voice activity is being detected, however the system may only use the output position data (or beam index data) when the voice activity indicator 1140 indicates that voice activity is actually detected (such as beyond a certain confidence). The classifier 1020 may also only be configured to determine a beam index is voice activity is detected.

Figure 19:
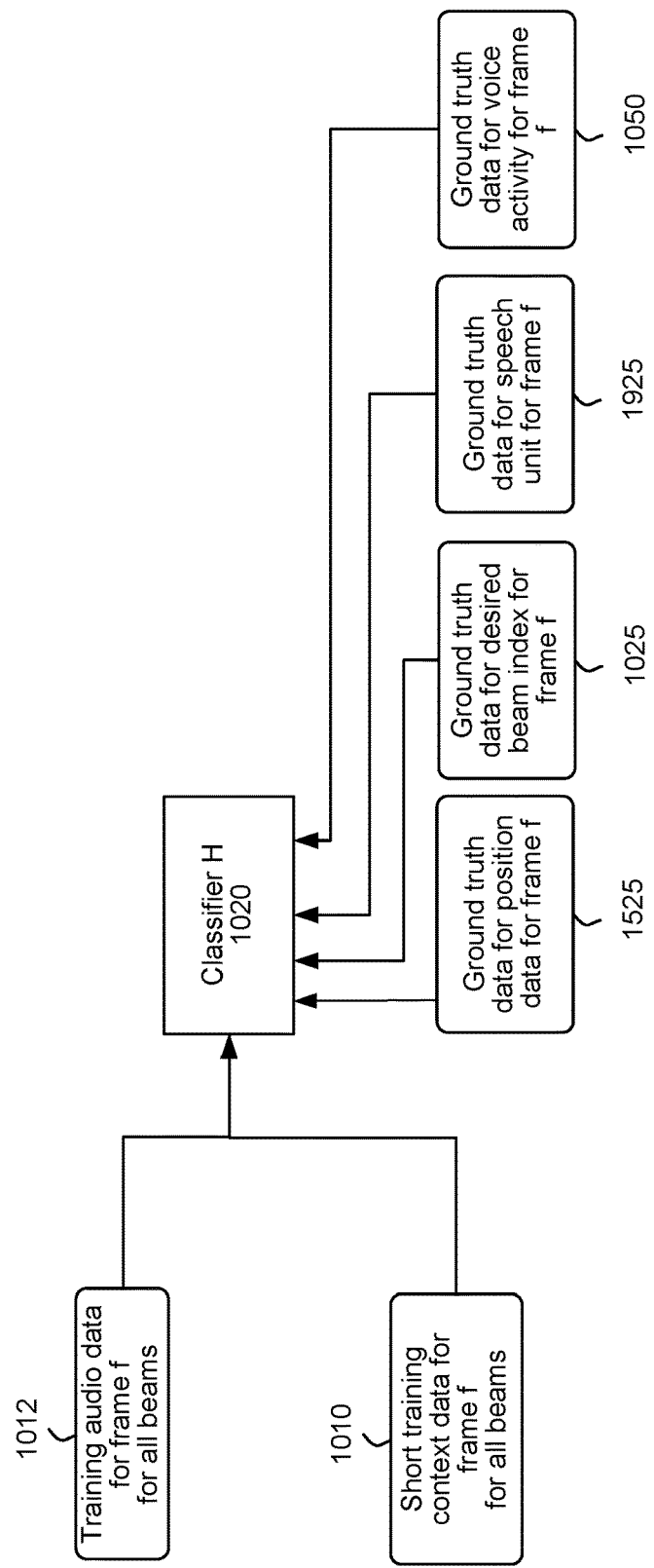
FIG. 19 illustrates training a classifier to determine a speech unit corresponding to received audio, a source position of desired audio and a desired beam according to embodiments of the present disclosure.
Figure 20:
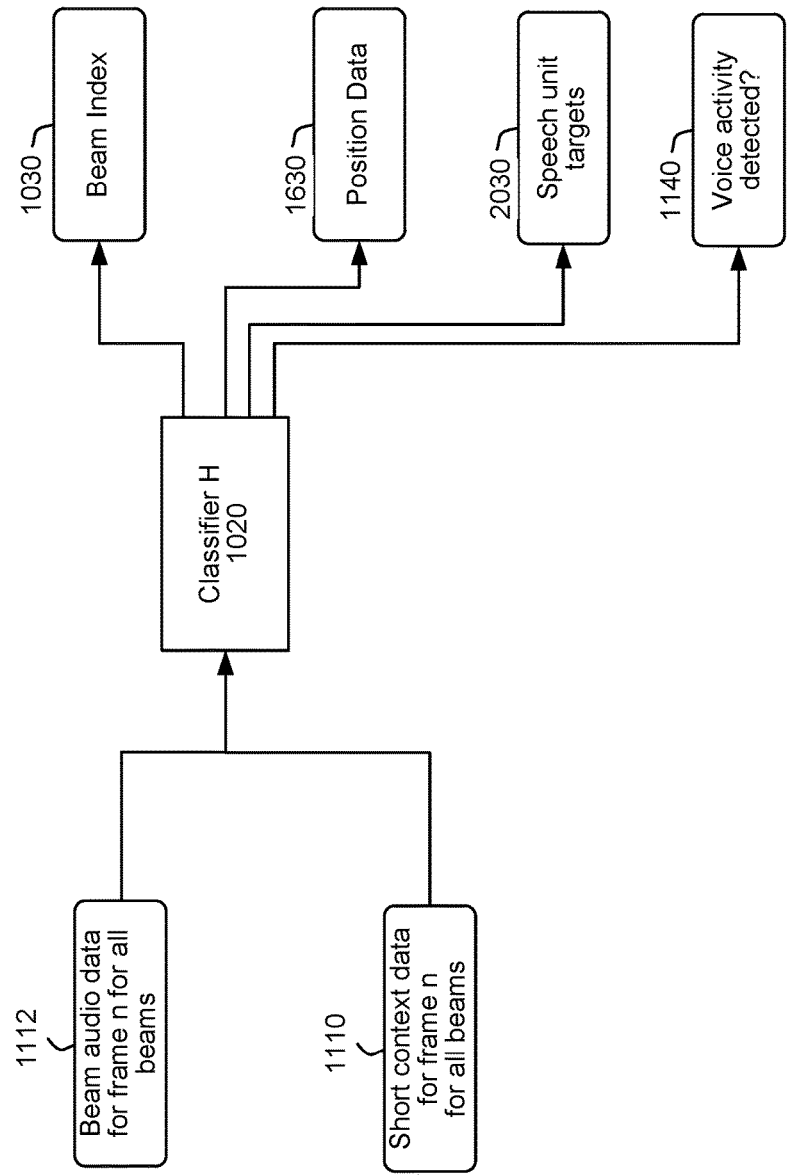
FIG. 20 illustrates using a classifier as trained in FIG. 19 to determine a speech unit corresponding to received audio, a source position of desired received audio and a desired beam from input audio according to embodiments of the present disclosure.

Depending on the system configuration, in certain embodiments, the classifier 1020 may also be trained to output an indicator of a speech unit (e.g., phoneme, senon, or the like) corresponding to the input speech. As can be appreciated, this may increase the size of classifier 1020 as well as the processing power needed to operate the classifier 1020, but a classifier configured to output speech units corresponding to input audio data, even if the classifier 1020 could only classify a limited number of speech units, may improve speech processing steps, for example wakeword detection, or other certain ASR tasks. To train a classifier in this manner, as illustrated in FIG. 19, at training time the classifier 1020 may be fed ground truth data 1925 which may include an indicator as to the index for a speech unit corresponding to the training audio frame f. Given sufficient training data, at runtime the classifier 1020, as shown in FIG. 20, may be able to input audio data and output not only the indicator of voice activity (1140), the indicator of the best beam (1030) and the indicator of position data (1630), but also the indicator of a target speech unit (2030) that the input audio frame n corresponds to. This may be useful, for example, in indicating whether an input audio frame n includes a speech unit corresponding to a wakeword. As a wakeword typically only includes a small subset of available speech units (for example, a wakeword may include 40 senons as opposed to the thousands of senons that are used in English). Thus, configuring a classifier 1020 to recognize, at runtime, speech units that are part of a wakeword (as opposed to all speech units used in English) may be more technically feasible when the classifier 1020 is running on a local device 110 (which may have fewer computing resources than a server 120). As computing abilities improve, the classifier 1020 may be trained to recognize further speech units as well.

At runtime, the speech units determined by the classifier 1020 may be processed to determine if a particular frame includes audio data corresponding to a desired speech unit (e.g., a speech unit of a wakeword). If it does, the audio data corresponding to the speech unit/frame (and potentially to the best beam) may be forwarded to a downstream component, such as a wakeword detection module 220, where other audio data not corresponding to a desired speech unit may not be sent for further processing. While the desired speech unit may be part of a particular keyword (such as a wakeword) it may also be part of some limited ASR capabilities that may be particular for a device 110, such as volume commands or the like (where the classifier 1020 is configured to recognize the speech units corresponding to those capabilities/commands). In this manner the classifier 1020 may assume some of the processing that may otherwise be performed by downstream components such as the wakeword detection module 220 and/or ASR module 250.

Figure 21:
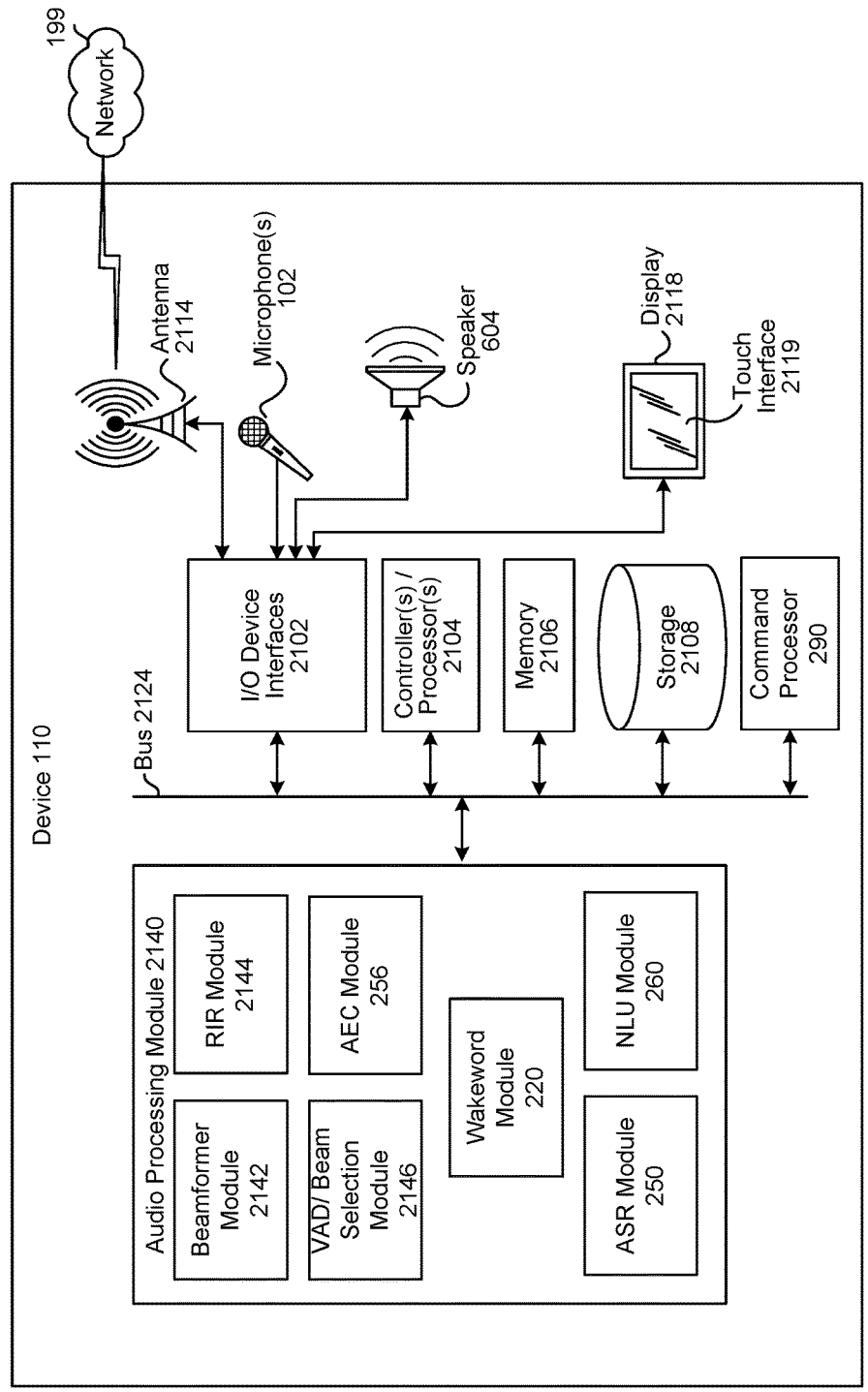
FIG. 21 is a block diagram conceptually illustrating example components of a device according to embodiments of the present disclosure.
Figure 22:
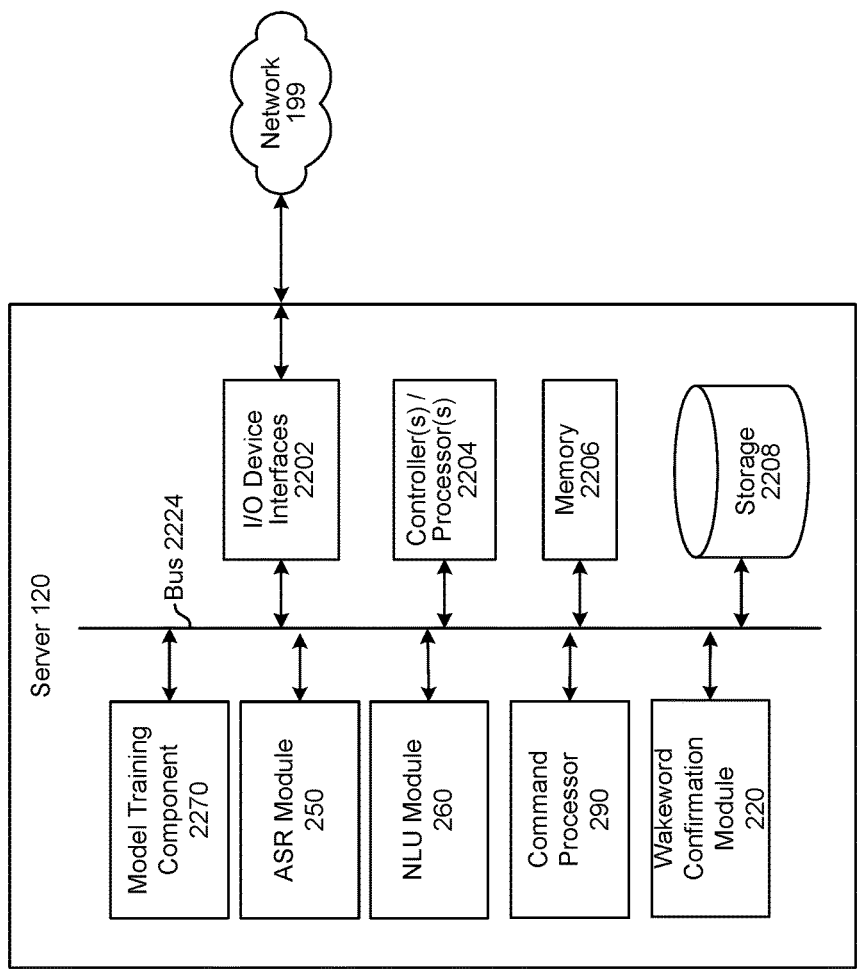
FIG. 22 is a block diagram conceptually illustrating example components of a server according to embodiments of the present disclosure.

FIG. 21 is a block diagram conceptually illustrating a local device 110 that may be used with the described system. FIG. 22 is a block diagram conceptually illustrating example components of a remote device, such as a remote server 120 that may assist with ASR, NLU processing, or command processing. Multiple such servers 120 may be included in the system, such as one server(s) 120 for training ASR models, one server(s) for performing ASR, one server(s) 120 for performing NLU, etc. In operation, each of these devices (or groups of devices) may include computer-readable and computer-executable instructions that reside on the respective device (110/120), as will be discussed further below.

Each of these devices (110/120) may include one or more controllers/processors (2104/2204), that may each include a central processing unit (CPU) for processing data and computer-readable instructions, and a memory (2106/2206) for storing data and instructions of the respective device. The memories (2106/2206) may individually include volatile random access memory (RAM), non-volatile read only memory (ROM), non-volatile magnetoresistive (MRAM) and/or other types of memory. Each device may also include a data storage component (2108/2208), for storing data and controller/processor-executable instructions. Each data storage component may individually include one or more non-volatile storage types such as magnetic storage, optical storage, solid-state storage, etc. Each device may also be connected to removable or external non-volatile memory and/or storage (such as a removable memory card, memory key drive, networked storage, etc.) through respective input/output device interfaces (2102/2202).

Computer instructions for operating each device (110/120) and its various components may be executed by the respective device's controller(s)/processor(s) (2104/2204), using the memory (2106/2206) as temporary "working" storage at runtime. A device's computer instructions may be stored in a non-transitory manner in non-volatile memory (2106/2206), storage (2108/2208), or an external device(s). Alternatively, some or all of the executable instructions may be embedded in hardware or firmware on the respective device in addition to or instead of software.

Each device (110/120) includes input/output device interfaces (2102/2202). A variety of components may be connected through the input/output device interfaces, as will be discussed further below. Additionally, each device (110/120) may include an address/data bus (2124/2224) for conveying data among components of the respective device. Each component within a device (110/120) may also be directly connected to other components in addition to (or instead of) being connected to other components across the bus (2124/2224).

Referring to the speech-controlled appliance 110 in FIG. 21, the input/output device interfaces 2102 connect to a variety of components such as a microphone 102 or microphone array 108, a speaker or speaker(s) 604, an one or more antennas 2114 supporting wireless communication. Via the antenna(s), the input/output device interfaces 2102 may connect to one or more networks 199 via a wireless local area network (WLAN) (such as WiFi) radio, Bluetooth, and/or wireless network radio, such as a radio capable of communication with a wireless communication network such as a Long Term Evolution (LTE) network, WiMAX network, 3G network, etc. A wired connection such as Ethernet may also be supported. Through the network(s) 199, the speech processing system may be distributed across a networked environment.

The device 110 may also include a display 2118, which may comprise a touch interface 2119. Or the device 110 may be "headless" and may primarily rely on spoken commands for input. As a way of indicating to a user that a connection between another device has been opened, the device 110 may be configured with a visual indicator, such as an LED or similar component (not illustrated), that may change color, flash, or otherwise provide visual indications by the device 110. The device 110 may also include input/output device interfaces 2102 that connect to a variety of components such as an audio output component such as a speaker 604, a wired headset or a wireless headset (not illustrated) or other component capable of outputting audio. The device 110 may also include an audio capture component. The audio capture component may be, for example, a microphone 102 or array of microphones 108, a wired headset or a wireless headset (not illustrated), etc. The microphone 102 may be configured to capture audio. If an array of microphones is included, approximate distance to a sound's point of origin may be performed acoustic localization based on time and amplitude differences between sounds captured by different microphones of the array. The device 110 (using microphone 102, wakeword detection module 220, ASR module 250, etc.) may be configured to determine audio data corresponding to detected audio data. The device 110 (using input/output device interfaces 2102, antenna 2114, etc.) may also be configured to transmit the audio data to server 120 for further processing or to process the data using internal components such as a wakeword detection module 220.

As illustrated, the device 110 may include, or otherwise have access to an audio processing module 2140. The audio processing module 2140 may include a beamformer module 2142, a room impulse response (RIR) determination module 2144, a lobe-selection module 2146, and an acoustic echo cancellation (AEC) module 256.

The beamformer module 2142 functions to create beampatterns, or effective directions of gain or attenuation. As illustrated and described herein, the beampatterns include multiple lobes, each altering a gain from a respective region within the environment of the device 110. The beamformer module 2142 may be configured to create an indicator of a direction of received audio for consideration by the speech processing system either local to the device 110 or at a remote server 120, to which the device 110 may send the indicator of the direction of the received audio. The indicator of a direction may indicate a direction relative to the device 110, a particular beam and/or lobe determined by the beamformer module 2142, or some other indicator. The beamformer module 2142 and/or other component (either of device 110 or of server 120) may also be configured to track the duration over which a particular audio source was detected, for example an audio source associated with a first direction as detected by the device 110. The system may then send an indicator of that duration from the device 110 to the server 120, and/or may incorporate that duration into the endpointing process discussed above.

The RIR determination module 2144, meanwhile, may function to determine a room impulse response (RIR) of the environment relative to the device 110 and may store the RIR in the storage 2108. In some instances, the module 2144 associates each RIR with a timestamp such that a history of the RIRs of the environment is maintained. To determine an RIR, the module 2144 may instruct the speaker 304 to emit a known sound within the environment. The microphones 2118 then capture sound of the known sound that is reflected by the environment (e.g., off walls, the ceiling, the floor, objects, etc.). The microphones 2118 may then capture an audio signal based on this reflected sound and the RIR determination module 2144 may compare the known sound to the reflected sound represented by the captured audio signal to identify variations there between. The MR determination module 2144 then calculates an MR of the environment based on these variations and stores this information in the storage 2108. As is known, this measured RIR may indicate a level of echo coming from different directions relative to the device 110, which aids in the device 110 determining if it is near a wall, corner, or other object that occupies a lobe of a particular beampattern.

The lobe-selection module 2146, meanwhile, functions to select one or more lobes of a beampattern to enhance based on the RIR of the environment, described above, as well as with reference to a history of lobes that have previously been found to include user speech. For instance, because the RIR may indicate when the device 110 is near a wall or other occluding object, and the direction of that wall or object relative to the device 110, the lobe-selection module may take that into account when determining which lobes of a beampattern to enhance.

In addition to referencing the RIR, the beam selection module 2146 may reference a history of which lobes have previously been found to include user speech. That is, if particular lobe(s) of a beampattern correspond to regions of an environment that have been found to often include user speech, then the beam selection module 2146 may increase the likelihood that these particular lobes will be enhanced. For instance, the lobe-selection module 2146 may analyze the storage 2108 to identify which lobes have previously been found to include user speech a threshold number of times or a threshold percentage of the time. Additionally or alternatively, the module 2146 may identify the lobe(s) that have most recently been found to include user speech (e.g., may identify the lobe that was last found to include user speech). The lobe-selection module 2146 may also operate using trained classifier 1020 as described above.

The lobe-selection module 2146 may then use the RIR measurement, the heuristics associated with previous lobe-selections, and an amount of energy associated with each lobe to select one or more lobes to enhance. The AEC module 256 may perform echo cancellation. The AEC module 256 compares audio that is output by the speaker(s) 604 of the device 110 with sound picked up by the microphone array 302 (or some other microphone used to capture spoken utterances), and removes the output sound from the captured sound in real time. Echo cancellation is commonly used by cellular telephones and other telephones operating as speaker phones, and facilitates the ASR process by removing a component of captured sounds that can interfere with speech recognition. The AEC module 256 may also work with other components, for example may apply more processing resources to preparing the portion of the audio signal corresponding to the selected lobes as compared to a remainder of the audio signal. Although illustrated as part of the audio processing module 2140, the AEC, and/or it functionality may be located elsewhere, for example in ASR module 250, etc.

The audio processing module 2140 may include a wakeword detection module 220. The wakeword detection module may perform wakeword detection as described above. The audio processing module 2140 may include a VAD/beam selection module 2146. The VAD/beam selection module 2146 (or some other component) may be configured to perform voice activity detection, for example using the trained classifier 1020 described above.

Although illustrated as residing on device 110, any number of components, such as those illustrated as part of the audio processing module 2140, may reside on server 120. For example, audio data captured by all microphones/beams of a device may be sent to the server 120, which may include the VAD/beam selection module 2146, or other components, and the server may process the incoming audio data with the trained classifier 1020 to perform beam selection and further audio processing.

The device 110 and/or server 120 may include an ASR module 250. The ASR module in device 110 may be of limited or extended capabilities. The ASR module 250 may include the language models 254 stored in ASR model storage component 252, and an ASR module 250 that performs the automatic speech recognition process. If limited speech recognition is included, the ASR module 250 may be configured to identify a limited number of words, such as keywords detected by the device, whereas extended speech recognition may be configured to recognize a much larger range of words. The ASR module 250 (or another component) may also be configured to check the ASR confidence using the techniques described above.

The device 110 and/or server 120 may include a limited or extended NLU module 260. The NLU module in device 110 may be of limited or extended capabilities. The NLU module 260 may comprising the name entity recognition module 262, the intent classification module 264 and/or other components. The NLU module 260 may also include a stored knowledge exchange and/or entity library, or those storages may be separately located.

The device 110 and/or server 120 may also include a command processor 290 that is configured to execute commands/functions associated with a spoken command as described above.

The device 110 may include a wakeword detection module 220, which may be a separate component. The wakeword detection module 220 receives audio signals and detects occurrences of a particular expression (such as a configured keyword) in the audio. This may include detecting a change in frequencies over a specific period of time where the change in frequencies results in a specific audio signature that the system recognizes as corresponding to the keyword. Keyword detection may include analyzing individual directional audio signals, such as those processed post-beamforming if applicable. Other techniques known in the art of keyword detection (also known as keyword spotting) may also be used. In some embodiments, the device 110 may be configured collectively to identify a set of the directional audio signals in which the wake expression is detected or in which the wake expression is likely to have occurred.

The wakeword detection module 220 receives captured audio and processes the audio (for example, using model(s) 232) to determine whether the audio corresponds to particular keywords recognizable by the device 110 and/or system 100. The storage 2108 may store data relating to keywords and functions to enable the wakeword detection module 220 to perform the algorithms and methods described above. The locally stored speech models may be pre-configured based on known information, prior to the device 110 being configured to access the network by the user. For example, the models may be language and/or accent specific to a region where the user device is shipped or predicted to be located, or to the user himself/herself, based on a user profile, etc. In an aspect, the models may be pre-trained using speech or audio data of the user from another device. For example, the user may own another user device that the user operates via spoken commands, and this speech data may be associated with a user profile. The speech data from the other user device may then be leveraged and used to train the locally stored speech models of the device 110 prior to the user device 110 being delivered to the user or configured to access the network by the user. The wakeword detection module 220 may access the storage 1108 and compare the captured audio to the stored models and audio sequences using audio comparison, pattern recognition, keyword spotting, audio signature, and/or other audio processing techniques.

The server may also include a model training component 2270 for training or retraining various model or classifiers discussed above. Various machine learning techniques may be used to perform various steps described above.

As noted above, multiple devices may be employed in a single speech processing system. In such a multi-device system, each of the devices may include different components for performing different aspects of the speech processing. The multiple devices may include overlapping components. The components of the devices 110 and server 120, as illustrated in FIGS. 21 and 22, are exemplary, and may be located a stand-alone device or may be included, in whole or in part, as a component of a larger device or system.

Figure 23:
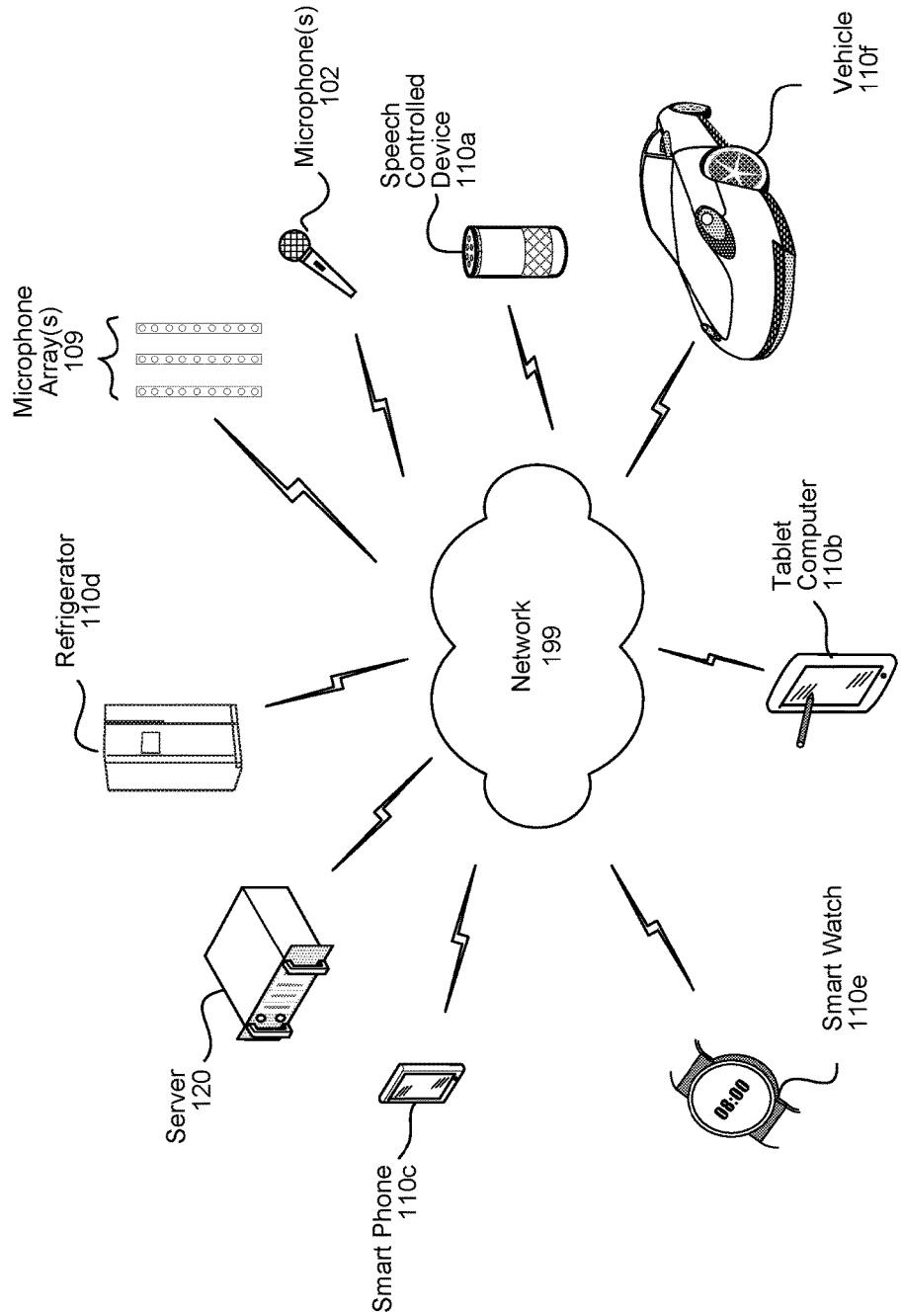
FIG. 23 illustrates an example of a computer network for use with the system.

As illustrated in FIG. 23 multiple devices (120, 120x, 110a to 110f) may contain components of the system 100 and the devices may be connected over a network 199. Network 199 may include a local or private network or may include a wide network such as the internet. Devices may be connected to the network 199 through either wired or wireless connections. For example, a speech controlled device 110a, a tablet computer 110b, a smart phone 110c, a refrigerator 110d, a smart watch 110e, and/or a vehicle 110f may be connected to the network 199 through a wireless service provider, over a WiFi or cellular network connection or the like. Other devices are included as network-connected support devices, such as a server 120, or others. The support devices may connect to the network 199 through a wired connection or wireless connection. Networked devices 110 may capture audio using one-or-more built-in or connected microphones 102 or audio capture devices such as microphone array 108, with processing performed by ASR, NLU, or other components of the same device or another device connected via network 199, such as an ASR 250, NLU 260, etc. of one or more servers 120.

The concepts disclosed herein may be applied within a number of different devices and computer systems, including, for example, general-purpose computing systems, speech processing systems, and distributed computing environments.

The above aspects of the present disclosure are meant to be illustrative. They were chosen to explain the principles and application of the disclosure and are not intended to be exhaustive or to limit the disclosure. Many modifications and variations of the disclosed aspects may be apparent to those of skill in the art. Persons having ordinary skill in the field of computers and speech processing should recognize that components and process steps described herein may be interchangeable with other components or steps, or combinations of components or steps, and still achieve the benefits and advantages of the present disclosure. Moreover, it should be apparent to one skilled in the art, that the disclosure may be practiced without some or all of the specific details and steps disclosed herein.

Aspects of the disclosed system may be implemented as a computer method or as an article of manufacture such as a memory device or non-transitory computer readable storage medium. The computer readable storage medium may be readable by a computer and may comprise instructions for causing a computer or other device to perform processes described in the present disclosure. The computer readable storage media may be implemented by a volatile computer memory, non-volatile computer memory, hard drive, solid-state memory, flash drive, removable disk and/or other media. In addition, components of one or more of the modules and engines may be implemented as in firmware or hardware, such as the acoustic front end 256, which comprise among other things, analog and/or digital filters (e.g., filters configured as firmware to a digital signal processor (DSP)).

As used in this disclosure, the term "a" or "one" may include one or more items unless specifically stated otherwise. Further, the phrase "based on" is intended to mean "based at least in part on" unless specifically stated otherwise.

What is claimed is:

1. A computer-implemented method comprising:
    capturing, during a first time period, first audio using a first microphone;
    capturing, during the first time period, second audio using a second microphone;
    determining first audio data corresponding to the first audio;
    determining second audio data corresponding to the second audio;
    determining, using at least the first audio data and the second audio data, third audio data corresponding to a first direction;
    determining, using at least the first audio data and the second audio data, fourth audio data corresponding to a second direction; and
    processing the third audio data and the fourth audio data with a neural network classifier to determine that the third audio data better represents speech than does the fourth audio data.

2. The computer-implemented method of claim 1, further comprising:
    before processing the third audio data and the fourth audio data with the neural network classifier, processing the first audio data and the second audio data with the neural network classifier to determine that at least one of the first audio data and the second audio data represents the speech.

3. The computer-implemented method of claim 1, further comprising:
    processing the first audio data and the second audio data with the neural network classifier to determine a distance between a source of the speech and the first microphone.

4. The computer-implemented method of claim 1, further comprising:

processing the first audio data and the second audio data with the neural network classifier to determine an angle between a source of the speech and the first microphone; and selecting, based on the angle, a beam associated with the first microphone.

5. The computer-implemented method of claim 1, further comprising:

before processing the third audio data and the fourth audio data with the neural network classifier, processing the first audio data and the second audio data with the neural network classifier to determine that the first audio data has a higher signal-to-noise ratio (SNR) than the second audio data.

6. The computer-implemented method of claim 1, further comprising:

processing the first audio data and the second audio data with the neural network classifier to determine a speech unit corresponding to the speech; and determining that the speech unit corresponds to at least a portion of a wakeword or at least a portion of a command.

7. The computer-implemented method of claim 1, further comprising:

wherein determining the third audio data comprises applying a first set of beamformer coefficients to the first audio data and the second audio data, and wherein determining the fourth audio data comprises applying a second set of beamformer coefficients to the first audio data and the second audio data.

8. The computer-implemented method of claim 1, further comprising:

capturing, during a second time period, third audio using the first microphone;

capturing, during the second time period, fourth audio using the second microphone;

determining fifth audio data corresponding to the third audio;

determining sixth audio data corresponding to the fourth audio;

determining, using at least the fifth audio data and the sixth audio data, seventh audio data corresponding to the first direction; and sending, to a server device, the seventh audio data.

9. The computer-implemented method of claim 1, wherein processing the third audio data and the fourth audio data comprises:

determining a first frame of the third audio data;

determining a second frame preceding the first frame; and determining, based at least on the second frame, that the first frame represents at least part of the speech.

10. The computer-implemented method of claim 1, further comprising:

after processing the third audio data and the fourth audio data with the neural network classifier, determining, using a speech recognition engine, text data corresponding to the speech.

11. A system comprising:

at least one processor;

at least one memory including instructions that, when executed by the at least one processor, cause the system to:

capture, during a first time period, first audio using a first microphone;

capture, during the first time period, second audio using a second microphone;

determine first audio data corresponding to the first audio;

determine second audio data corresponding to the second audio;

determine, using at least the first audio data and the second audio data, third audio data corresponding to a first direction;

determine, using at least the first audio data and the second audio data, fourth audio data corresponding to a second direction; and process the third audio data and the fourth audio data with a neural network classifier to determine that the third audio data better represents speech than does the fourth audio data.

12. The system of claim 11, wherein the instructions further cause the system to:

before processing the third audio data and the fourth audio data with the neural network classifier, process the first audio data and the second audio data with the neural network classifier to determine that at least one of the first audio data and the second audio data represents the speech.

13. The system of claim 11, wherein the instructions further cause the system to:

process the first audio data and the second audio data with the neural network classifier to determine a distance between a source of the speech and the first microphone.

14. The system of claim 11, wherein the instructions further cause the system to:

process the first audio data and the second audio data with the neural network classifier to determine an angle between a source of the speech and the first microphone; and select, based on the angle, a beam associated with the first microphone.

15. The system of claim 11, wherein the instructions further cause the system to:

before processing the third audio data and the fourth audio data with the neural network classifier, process the first audio data and the second audio data with the neural network classifier to determine that the first audio data has a higher signal-to-noise ratio (SNR) than the second audio data.

16. The system of claim 11, wherein the instructions further cause the system to:

process the first audio data and the second audio data with the neural network classifier to determine a speech unit corresponding to the speech; and determine that the speech unit corresponds to at least a portion of a wakeword or at least a portion of a command.

17. The system of claim 11, wherein the instructions that cause the system to determine the third audio data further cause the system to apply a first set of beamformer coefficients to the first audio data and the second audio data, and wherein the instructions that cause the system to determine the fourth audio data further cause the system to apply a second set of beamformer coefficients to the first audio data and the second audio data.

18. The system of claim 11, wherein the instructions further cause the system to:

capture, during a second time period, third audio using the first microphone;

capture, during the second time period, fourth audio using the second microphone;

determine fifth audio data corresponding to the third audio;

determine sixth audio data corresponding to the fourth audio;

determine, using at least the fifth audio data and the sixth audio data, seventh audio data corresponding to the first direction; and send, to a server device, the seventh audio data.

19. The system of claim 11, wherein the instructions that cause the system to process the third audio data and the fourth audio data further cause the system to:

determine a first frame of the third audio data;

determine a second frame preceding the first frame; and determine, based at least on the second frame, that the first frame represents at least part of the speech.

20. The system of claim 11, wherein the instructions further cause the system to:

after processing the third audio data and the fourth audio data with the neural network classifier, determine, using a speech recognition engine, text data corresponding to the speech.

\* \* \* \* \*